US007925551B2

(12) United States Patent  
Hahn-Carlson et al.

(10) Patent No.: US 7,925,551 B2
(45) Date of Patent: Apr. 12, 2011

(54) AUTOMATED TRANSACTION PROCESSING SYSTEM AND APPROACH

(75) Inventors: Dean W. Hahn-Carlson, St. Paul, MN (US); Raghunandan Kanathur, Blaine, MN (US); David A. Suits, Robbinsdale, MN (US); Weiwen Xie, Woodbury, MN (US)

(73) Assignee: Syncada LLC, Minneapolis, MN (US)

( * ) Notice: Subject to any disclaimer, the term of this patent is extended or adjusted under 35 U.S.C. 154(b) by 1396 days.

(21) Appl. No.: 10/864,761

(22) Filed: Jun. 9, 2004

(65) Prior Publication Data
US 2005/0278220 A1 Dec. 15, 2005

(51) Int. Cl.
*G07B 17/00* (2006.01)
*G06F 7/00* (2006.01)
*G06F 17/30* (2006.01)
*G06F 17/00* (2006.01)
*G06Q 40/00* (2006.01)

(52) U.S. Cl. ............ 705/30; 707/102; 707/205; 705/39; 345/418

(58) Field of Classification Search .................... 705/30; 707/102, 205
See application file for complete search history.

(56) References Cited

U.S. PATENT DOCUMENTS

| 4,114,027 A | 9/1978 | Slater et al. |
| 4,270,042 A | 5/1981 | Case |
| 4,305,059 A | 12/1981 | Benton |
| 4,412,287 A | 10/1983 | Braddock, III |
| 4,507,778 A * | 3/1985 | Tan ............................... 370/443 |
| 4,567,359 A | 1/1986 | Lockwood |
| 4,713,761 A | 12/1987 | Sharpe et al. |
| 4,725,719 A | 2/1988 | Oncken et al. |
| 4,750,119 A | 6/1988 | Cohen et al. |
| 4,926,325 A | 5/1990 | Benton et al. |
| 4,949,272 A | 8/1990 | Vanourek et al. |
| 4,960,981 A | 10/1990 | Benton et al. |
| 4,996,662 A * | 2/1991 | Cooper et al. ..................... 707/1 |
| 5,008,827 A | 4/1991 | Sansone et al. |
| 5,025,372 A | 6/1991 | Burton et al. |
| 5,040,132 A | 8/1991 | Schuricht et al. |
| 5,043,908 A | 8/1991 | Manduley et al. |
| 5,054,096 A * | 10/1991 | Beizer ........................... 382/305 |
| 5,077,694 A | 12/1991 | Sansone et al. |
| 5,117,364 A | 5/1992 | Barns-Slavin et al. |
| 5,151,948 A * | 9/1992 | Lyke et al. .................... 382/138 |

(Continued)

FOREIGN PATENT DOCUMENTS

EP 425421 A2 * 5/1991

(Continued)

*Primary Examiner* — Matthew S Gart
*Assistant Examiner* — Ashford Hayles
(74) *Attorney, Agent, or Firm* — Crawford Maunu PLLC

(57) ABSTRACT

Transaction processing is facilitated using an approach for automatically grouping transaction-based documents as a function of matching data in the documents. In one example embodiment of the present invention, data from selected attribute fields in transaction-based documents is parsed as the documents are received at a transaction processor. When data in selected attribute fields from two or more documents match, the transaction processor automatically groups the documents having matching data under a particular anchor identification code defined as a function of the match. Upon receipt of one or more other transaction-based documents, the transaction processor advances progress towards completion of the common transaction to which the documents apply. With this approach, predefined data (e.g., a purchase order number) need not necessarily be included with a particular transaction document in order to group the document with another document belonging to the same common transaction.

45 Claims, 7 Drawing Sheets

U.S. PATENT DOCUMENTS

| | | | |
|---|---|---|---|
| 5,153,842 A | 10/1992 | Dlugos, Sr. et al. | |
| 5,159,667 A * | 10/1992 | Borrey et al. | 715/205 |
| 5,161,109 A | 11/1992 | Keating et al. | |
| 5,168,444 A | 12/1992 | Cukor et al. | |
| 5,175,416 A | 12/1992 | Mansvelt et al. | |
| 5,208,446 A | 5/1993 | Martinez | |
| 5,218,188 A | 6/1993 | Hanson | |
| 5,220,501 A | 6/1993 | Lawlor et al. | |
| 5,222,018 A | 6/1993 | Sharpe et al. | |
| 5,231,569 A | 7/1993 | Myatt et al. | |
| 5,285,383 A | 2/1994 | Lindsey et al. | |
| 5,293,310 A | 3/1994 | Carroll et al. | |
| 5,329,589 A | 7/1994 | Fraser et al. | |
| 5,334,823 A | 8/1994 | Noblett, Jr. et al. | |
| 5,334,824 A | 8/1994 | Martinez | |
| 5,337,246 A | 8/1994 | Carroll et al. | |
| 5,357,563 A | 10/1994 | Hamilton et al. | |
| 5,393,963 A | 2/1995 | Thomas et al. | |
| 5,426,281 A | 6/1995 | Abecassis | |
| 5,440,634 A | 8/1995 | Jones et al. | |
| 5,485,369 A | 1/1996 | Nicholls et al. | |
| 5,631,827 A | 5/1997 | Nicholls et al. | |
| 5,652,749 A * | 7/1997 | Davenport et al. | 370/466 |
| 5,677,955 A | 10/1997 | Doggett et al. | |
| 5,694,334 A * | 12/1997 | Donahue et al. | 709/247 |
| 5,694,551 A | 12/1997 | Doyle et al. | |
| 5,717,989 A | 2/1998 | Tozzoli et al. | |
| 5,754,854 A * | 5/1998 | Kanamori et al. | 718/104 |
| 5,774,170 A * | 6/1998 | Hite et al. | 725/34 |
| 5,806,063 A | 9/1998 | Dickens | |
| 5,845,283 A * | 12/1998 | Williams et al. | 707/101 |
| 5,893,080 A | 4/1999 | McGurl et al. | |
| 5,897,645 A * | 4/1999 | Watters | 715/210 |
| 5,910,896 A | 6/1999 | Hahn-Carlson | |
| 5,917,830 A * | 6/1999 | Chen et al. | 370/487 |
| 5,918,229 A * | 6/1999 | Davis et al. | 1/1 |
| 5,924,082 A | 7/1999 | Silverman et al. | |
| 5,943,670 A * | 8/1999 | Prager | 707/5 |
| 5,960,407 A | 9/1999 | Vivona | |
| 5,970,475 A * | 10/1999 | Barnes et al. | 705/27 |
| 5,973,685 A * | 10/1999 | Schaffa et al. | 715/722 |
| 5,978,567 A * | 11/1999 | Rebane et al. | 709/219 |
| 5,987,506 A * | 11/1999 | Carter et al. | 709/213 |
| 5,991,801 A * | 11/1999 | Rebec et al. | 725/116 |
| 6,021,202 A | 2/2000 | Anderson et al. | |
| 6,043,819 A * | 3/2000 | LeBrun et al. | 345/418 |
| 6,044,362 A * | 3/2000 | Neely | 705/34 |
| 6,055,519 A | 4/2000 | Kennedy et al. | |
| 6,058,380 A * | 5/2000 | Anderson et al. | 705/40 |
| 6,085,200 A * | 7/2000 | Hill et al. | 1/1 |
| 6,097,834 A | 8/2000 | Krouse et al. | |
| 6,115,711 A * | 9/2000 | White | 1/1 |
| 6,119,163 A * | 9/2000 | Monteiro et al. | 709/227 |
| 6,131,087 A | 10/2000 | Luke et al. | |
| 6,151,588 A | 11/2000 | Tozzoli et al. | |
| 6,169,542 B1 * | 1/2001 | Hooks et al. | 715/719 |
| 6,209,095 B1 * | 3/2001 | Anderson et al. | 713/176 |
| 6,223,168 B1 | 4/2001 | McGurl et al. | |
| 6,275,813 B1 * | 8/2001 | Berka | 705/30 |
| 6,317,737 B1 * | 11/2001 | Gorelik et al. | 707/3 |
| 6,324,551 B1 * | 11/2001 | Lamping et al. | 715/229 |
| 6,338,044 B1 * | 1/2002 | Cook et al. | 705/14.54 |
| 6,357,042 B2 * | 3/2002 | Srinivasan et al. | 725/32 |
| 6,421,691 B1 * | 7/2002 | Kajitani | 715/234 |
| 6,499,036 B1 * | 12/2002 | Gurevich | 707/778 |
| 6,505,169 B1 * | 1/2003 | Bhagavath et al. | 705/14.66 |
| 6,507,826 B1 * | 1/2003 | Maners | 705/34 |
| 6,526,443 B1 * | 2/2003 | Goldsmith et al. | 709/224 |
| 6,571,149 B1 | 5/2003 | Hahn-Carlson | |
| 6,607,081 B2 * | 8/2003 | Graef et al. | 209/534 |
| 6,629,081 B1 * | 9/2003 | Cornelius et al. | 705/30 |
| 6,697,702 B1 * | 2/2004 | Hahn-Carlson | 700/213 |
| 6,833,865 B1 * | 12/2004 | Fuller et al. | 348/231.2 |
| 6,873,997 B1 * | 3/2005 | Majjasie et al. | 1/1 |
| 6,882,983 B2 * | 4/2005 | Furphy et al. | 705/30 |
| 6,973,258 B1 * | 12/2005 | Yoo et al. | 386/111 |
| 6,983,278 B1 * | 1/2006 | Yu et al. | 1/1 |
| 6,988,111 B2 * | 1/2006 | Chow et al. | 1/1 |
| 7,054,841 B1 * | 5/2006 | Tenorio | 705/57 |
| 7,069,234 B1 * | 6/2006 | Cornelius et al. | 705/26 |
| 7,079,176 B1 * | 7/2006 | Freeman et al. | 348/207.1 |
| 7,113,964 B1 * | 9/2006 | Bequet et al. | 707/204 |
| 7,120,871 B1 * | 10/2006 | Harrington | 715/205 |
| 7,124,150 B2 * | 10/2006 | Majjasie et al. | 1/1 |
| 7,131,069 B1 * | 10/2006 | Rush et al. | 715/738 |
| 7,143,058 B2 * | 11/2006 | Sugimoto et al. | 705/27 |
| 7,149,744 B1 * | 12/2006 | Tenorio | 1/1 |
| 7,243,139 B2 * | 7/2007 | Ullman et al. | 709/219 |
| 7,254,588 B2 * | 8/2007 | Sung et al. | 707/104.1 |
| 7,373,365 B2 * | 5/2008 | Varadarajan et al. | 382/306 |
| 7,415,471 B1 * | 8/2008 | Coleman | 1/1 |
| 7,437,310 B1 * | 10/2008 | Dutta | 705/26 |
| 7,448,063 B2 * | 11/2008 | Freeman et al. | 725/136 |
| 7,558,793 B1 * | 7/2009 | Topolovac et al. | 1/1 |
| 7,634,455 B1 * | 12/2009 | Keene et al. | 1/1 |
| 7,640,195 B2 * | 12/2009 | Von Zimmermann et al. | 705/30 |
| 7,660,788 B1 * | 2/2010 | Clark | 707/764 |
| 2001/0025262 A1 * | 9/2001 | Ahmed | 705/33 |
| 2001/0039522 A1 * | 11/2001 | Saxon | 705/30 |
| 2002/0038305 A1 * | 3/2002 | Bahl et al. | 707/100 |
| 2002/0072956 A1 | 6/2002 | Willems et al. | |
| 2002/0107794 A1 * | 8/2002 | Furphy et al. | 705/40 |
| 2002/0156797 A1 * | 10/2002 | Lee et al. | 707/200 |
| 2002/0161719 A1 | 10/2002 | Manning et al. | |
| 2002/0184527 A1 | 12/2002 | Chun et al. | |
| 2003/0093320 A1 * | 5/2003 | Sullivan | 705/19 |
| 2003/0158811 A1 | 8/2003 | Sanders et al. | |
| 2003/0212617 A1 * | 11/2003 | Stone et al. | 705/30 |
| 2003/0233252 A1 * | 12/2003 | Haskell et al. | 705/2 |
| 2004/0098663 A1 * | 5/2004 | Rey et al. | 715/500 |
| 2004/0107123 A1 * | 6/2004 | Haffner et al. | 705/7 |
| 2004/0107125 A1 * | 6/2004 | Guheen et al. | 705/7 |
| 2004/0117383 A1 * | 6/2004 | Lee et al. | 707/100 |
| 2004/0172360 A1 * | 9/2004 | Mabrey et al. | 705/40 |
| 2004/0187075 A1 * | 9/2004 | Maxham et al. | 715/511 |
| 2005/0027651 A1 * | 2/2005 | DeVault | 705/38 |
| 2005/0033760 A1 * | 2/2005 | Fuller et al. | 707/100 |
| 2005/0075964 A1 * | 4/2005 | Quinn et al. | 705/37 |
| 2005/0137947 A1 * | 6/2005 | Schaub et al. | 705/30 |
| 2005/0177507 A1 * | 8/2005 | Bandych et al. | 705/40 |
| 2005/0256802 A1 * | 11/2005 | Ammermann et al. | 705/44 |
| 2006/0233334 A1 * | 10/2006 | Bingaman et al. | 379/126 |
| 2007/0214065 A1 * | 9/2007 | Kahlon et al. | 705/28 |
| 2007/0271160 A1 * | 11/2007 | Stone et al. | 705/30 |
| 2008/0082374 A1 * | 4/2008 | Kennis et al. | 705/7 |

FOREIGN PATENT DOCUMENTS

| | | |
|---|---|---|
| WO | WO 97/07468 | 2/1997 |

* cited by examiner

CASE: Order Received First
Buyer Business Rule is Primary Match ID = Order Number, Secondary Match ID = Invoice Number.

| SEQ | ANCHOR ID (KEY) | Named Party ID (KEY) | DocID (KEY) | Doc Type (KEY) | Named Party Role (KEY) | DocRN | Named Buyer ID (KEY) | Reference Anchor ID | DocType | DocID | DocOwner OrgID | Named Party ID | Primary Match ID | Secondary Match ID | Named Party Role | DocRN |
|---|---|---|---|---|---|---|---|---|---|---|---|---|---|---|---|---|
| 1 | | | | | | | | | Order | OR123 | 5555 | 5555 | OR123 | NULL | Buyer | 91001 |
|   |      |      |       |         |        |       |      |      |        |       |      | 3333 | OR123 | NULL  | Seller |       |
| 2 | 1234 | 5555 | OR123 | Order   | Buyer  | 91001 | 5555 | NULL |        |       |      |      |       |       |        |       |
|   | 1234 | 3333 | OR123 | Order   | Seller | 91001 | 5555 | NULL |        |       |      |      |       |       |        |       |
| 3 | | | | | | | | | Invoice | IN456 | 3333 | 3333 | OR123 | IN456 | Seller | 91003 |
|   |      |      |       |         |        |       |      |      |         |       |      | 5555 | OR123 | IN456 | Buyer  |       |
| 4 | 1234 | 5555 | IN456 | Invoice | Buyer  | 91003 | 5555 | NULL | | | | Finds Anchor | | | | |
|   | 1234 | 3333 | IN456 | Invoice | Seller | 91003 | 5555 | NULL |
|   | 1234 | 5555 | OR123 | Order   | Buyer  | 91001 | 5555 | NULL |
|   | 1234 | 3333 | OR123 | Order   | Seller | 91001 | 5555 | NULL |
| 5 | | | | | | | | | eBill | EB987 | 3333 | 3333 | NULL | IN456 | Seller | 91023 |
|   |      |      |       |         |        |       |      |      |       |       |      | 5555 | NULL | IN456 | Buyer  |       |
| 6 | 1234 | 5555 | EB987 | eBill   | Buyer  | 91023 | 5555 | NULL | | | | Finds Anchor | | | | |
|   | 1234 | 3333 | EB987 | eBill   | Seller | 91023 | 5555 | NULL |
|   | 1234 | 5555 | IN456 | Invoice | Buyer  | 91003 | 5555 | NULL |
|   | 1234 | 3333 | IN456 | Invoice | Seller | 91003 | 5555 | NULL |
|   | 1234 | 5555 | OR123 | Order   | Buyer  | 91001 | 5555 | NULL |
|   | 1234 | 3333 | OR123 | Order   | Seller | 91001 | 5555 | NULL |
| 7 | | | | | | | | | Invoice | IN6543 | 8888 | 3333 | NULL | IN456 | Buyer | 91025 |
|   |      |      |        |         |        |       |      |      |         |        |      | 8888 | NULL | IN456 | Seller |       |
| 8 | 7654 | 3333 | IN456  | Invoice | Buyer  | 91025 | 3333 | 1234 | | | | No Match as Named Party Roles don't match. | | | | |
|   | 7654 | 8888 | IN456  | Invoice | Seller | 91025 | 3333 | 1234 | | | | Create new anchor. | | | | |
|   | 7654 | 3333 | IN6543 | Invoice | Buyer  | 91025 | 3333 | 1234 |
|   | 7654 | 8888 | IN6543 | Invoice | Seller | 91025 | 3333 | 1234 |
|   | 1234 | 5555 | EB987 | eBill   | Buyer  | 91023 | 5555 | 7654 |
|   | 1234 | 3333 | EB987 | eBill   | Seller | 91023 | 5555 | 7654 |
|   | 1234 | 5555 | IN456 | Invoice | Buyer  | 91003 | 5555 | 7654 |
|   | 1234 | 3333 | IN456 | Invoice | Seller | 91003 | 5555 | 7654 |
|   | 1234 | 5555 | OR123 | Order   | Buyer  | 91001 | 5555 | 7654 |
|   | 1234 | 3333 | OR123 | Order   | Seller | 91001 | 5555 | 7654 |
| 9 | | | | | | | | | Status | IN6543a | 8888 | 3333 | NULL | IN6543 | Buyer | 91030 |
| 10| 7654 | 8888 | IN6543a | Status | Seller | 91030 | 3333 | 1234 | | | | Match found. | | | | |
|   | 7654 | 3333 | IN6543a | Status | Buyer  | 91030 | 3333 | 1234 |
|   | 7654 | 3333 | IN456   | Invoice | Buyer | 91025 | 3333 | 1234 |
|   | 7654 | 8888 | IN456   | Invoice | Seller| 91025 | 3333 | 1234 |
|   | 7654 | 3333 | IN6543  | Invoice | Buyer | 91025 | 3333 | 1234 |
|   | 7654 | 8888 | IN6543  | Invoice | Seller| 91025 | 3333 | 1234 |
| 11| | | | | | | | | Status | IN456AB | 3333 | 3333 | NULL | IN456 | Seller | 91060 |
| 12| 1234 | 3333 | IN456   | Status | Seller | 91060 | 5555 | 7654 |
|   | 1234 | 3333 | IN456AB | Status | Seller | 91060 | 5555 | 7654 |
|   | 1234 | 5555 | EB987   | eBill  | Buyer  | 91023 | 5555 | 7654 |
|   | 1234 | 3333 | EB987   | eBill  | Seller | 91023 | 5555 | 7654 |
|   | 1234 | 5555 | IN456   | Invoice| Buyer  | 91003 | 5555 | 7654 |
|   | 1234 | 3333 | IN456   | Invoice| Seller | 91003 | 5555 | 7654 |
|   | 1234 | 5555 | OR123   | Order  | Buyer  | 91001 | 5555 | 7654 |
|   | 1234 | 3333 | OR123   | Order  | Seller | 91001 | 5555 | 7654 |
| 13| | | | | | | | | eBill | EB891 | 5555 | 5555 | NULL | EB891 | Buyer | 91061 |
|   |      |      |         |        |        |       |      |      |       |       |      | 3333 | NULL | EB987 | Seller |       |
| 14| 1234 | 3333 | EB987   | eBill  | Seller | 91061 | 5555 | 7654 |
|   | 1234 | 5555 | EB987   | eBill  | Buyer  | 91061 | 5555 | 7654 |
|   | 1234 | 3333 | IN456   | Status | Seller | 91060 | 5555 | 7654 |
|   | 1234 | 3333 | IN456AB | Status | Seller | 91060 | 5555 | 7654 |
|   | 1234 | 5555 | EB987   | eBill  | Buyer  | 91023 | 5555 | 7654 |
|   | 1234 | 3333 | EB987   | eBill  | Seller | 91023 | 5555 | 7654 |
|   | 1234 | 5555 | IN456   | Invoice| Buyer  | 91003 | 5555 | 7654 |
|   | 1234 | 3333 | IN456   | Invoice| Seller | 91003 | 5555 | 7654 |
|   | 1234 | 5555 | OR123   | Order  | Buyer  | 91001 | 5555 | 7654 |
|   | 1234 | 3333 | OR123   | Order  | Seller | 91001 | 5555 | 7654 |

Fig. 5A

CASE: Seller Not Named Seller
Buyer Business Rule is Primary Match ID = Order Number, Secondary Match ID = Invoice Number.

| | KEY | KEY | KEY | KEY | KEY | KEY | | | | | | | | | |
|---|---|---|---|---|---|---|---|---|---|---|---|---|---|---|---|
| | | | ANCHOR VECTOR | | | | | | | | | | | | | |
| SEQ | ANCHOR ID | Named Party ID | DocID | Doc Type | Named Party Role | DocRN | Named Buyer ID | Referenced Anchor ID | DocType | DocID | Doc Owner OrgID | Named Party OrgID | Primary Match ID | Secondary Match ID | Named Party Role | DocRN |
| 1 | | | | | | | | | Order | OR123 | 6666 | 6666 | OR123 | NULL | Buyer | 91001 |
| | | | | | | | | | | | | 3333 | OR123 | NULL | Seller | 91001 |
| 2 | 1234 | 6666 | OR123 | Order | Buyer | 91001 | 6666 | NULL | | | | Buyer & Seller Named | | | | |
| | 1234 | 3333 | OR123 | Order | Seller | 91001 | 6666 | NULL | | | | | | | | |
| 3 | | | | | | | | | Invoice | IN222 | 4444 | 6666 | OR123 | IN222 | Buyer | 91025 |
| | | | | | | | | | | | | 4444 | OR123 | IN222 | Seller | |
| 4 | 1234 | 6666 | OR123 | Order | Buyer | 91001 | 6666 | 5678 | | | | Finds Anchor but with different | | | | |
| | 1234 | 3333 | OR123 | Order | Seller | 91001 | 6666 | 5678 | | | | Seller listed. Therefore, Insert as new Anchor | | | | |
| | | | | | | | | | | | | with Anchor cross-references | | | | |
| | 5678 | 4444 | IN222 | Invoice | Seller | 91025 | 6666 | 1234 | | | | | | | | |
| | 5678 | 6666 | IN222 | Invoice | Buyer | 91025 | 6666 | 1234 | | | | | | | | |
| | 5678 | 4444 | ORD123 | Order | Seller | 91025 | 6666 | 1234 | | | | | | | | |
| | 5678 | 6666 | ORD123 | Order | Buyer | 91025 | 6666 | 1234 | | | | | | | | |
| 5 | | | | | | | | | eBill | EB987 | 4444 | 4444 | NULL | IN222 | Seller | 91023 |
| | | | | | | | | | | | | 6666 | NULL | IN222 | Buyer | |
| 6 | 1234 | 6666 | OR123 | Order | Buyer | 91001 | 6666 | 5678 | | | | | | | | |
| | 1234 | 3333 | OR123 | Order | Seller | 91001 | 6666 | 5678 | | | | | | | | |
| | 5678 | 4444 | IN222 | Invoice | Seller | 91025 | 6666 | 1234 | | | | | | | | |
| | 5678 | 6666 | IN222 | Invoice | Buyer | 91025 | 6666 | 1234 | | | | | | | | |
| | 5678 | 4444 | ORD123 | Order | Seller | 91025 | 6666 | 1234 | | | | | | | | |
| | 5678 | 6666 | ORD123 | Order | Buyer | 91025 | 6666 | 1234 | | | | | | | | |
| | 5678 | 4444 | EB987 | eBill | Seller | 91023 | 6666 | 1234 | | | | | | | | |
| | 5678 | 6666 | EB987 | eBill | Buyer | 91023 | 6666 | 1234 | | | | | | | | |
| 7 | | | | | | | | | Status | IN222A | 4444 | 4444 | NULL | IN222 | Seller | 91030 |
| 8 | 1234 | 6666 | OR123 | Order | Buyer | 91001 | 6666 | 5678 | | | | | | | | |
| | 1234 | 3333 | OR123 | Order | Seller | 91001 | 6666 | 5678 | | | | | | | | |
| | 5678 | 4444 | IN222 | Invoice | Seller | 91025 | 6666 | 1234 | | | | | | | | |
| | 5678 | 6666 | IN222 | Invoice | Buyer | 91025 | 6666 | 1234 | | | | | | | | |
| | 5678 | 4444 | ORD123 | Order | Seller | 91025 | 6666 | 1234 | | | | | | | | |
| | 5678 | 6666 | ORD123 | Order | Buyer | 91025 | 6666 | 1234 | | | | | | | | |
| | 5678 | 4444 | EB987 | eBill | Seller | 91023 | 6666 | 1234 | | | | | | | | |
| | 5678 | 6666 | EB987 | eBill | Buyer | 91023 | 6666 | 1234 | | | | | | | | |
| | 5678 | 4444 | IN222A | Status | Seller | 91030 | 6666 | 1234 | | | | | | | | |
| | 5678 | 6666 | IN222A | Status | Buyer | 91030 | 6666 | 1234 | | | | | | | | |
| 9 | | | | | | | | | | | | | | | | |
| 10 | 1234 | 6666 | OR123 | Order | Buyer | 91001 | 6666 | Null | | | | | | | | |
| | 1234 | 4444 | OR123 | Order | Seller | 91001 | 6666 | Null | | | | Buyer changes Seller ID | | | | |
| | 1234 | 4444 | IN222 | Invoice | Seller | 91025 | 6666 | Null | | | | System looks in Referenced Anchor ID | | | | |
| | 1234 | 6666 | IN222 | Invoice | Buyer | 91025 | 6666 | Null | | | | System finds circled match and links everything together | | | | |
| | 1234 | 4444 | ORD123 | Order | Seller | 91025 | 6666 | Null | | | | *Changed automatically by system* | | | | |
| | 1234 | 6666 | ORD123 | Order | Buyer | 91025 | 6666 | Null | | | | | | | | |
| | 1234 | 4444 | EB987 | eBill | Seller | 91023 | 6666 | Null | | | | | | | | |
| | 1234 | 6666 | EB987 | eBill | Buyer | 91023 | 6666 | Null | | | | | | | | |
| | 1234 | 4444 | IN222A | Status | Seller | 91030 | 6666 | Null | | | | | | | | |
| | 1234 | 6666 | IN222A | Status | Buyer | 91030 | 6666 | Null | | | | | | | | |

AUTOMATED TRANSACTION PROCESSING SYSTEM AND APPROACH

FIELD OF THE INVENTION

The present invention is directed to business interactions and, more specifically, to the processing and management of business interactions involving the grouping of these interactions into categories.

BACKGROUND

Business transaction processing has typically involved intensive manual effort and, in instances where automatic processing has been used, intensive user intervention. For example, transaction processes involve the use of a variety of transaction documents such as orders, invoices, receipts and bills of lading (BOL). These types of transaction documents include information associated with the transaction that is used by parties to the transaction to monitor and process the transaction.

Business transaction documents are electronically processed for a multitude of different types of business applications. Business interaction data, (e.g., electronic or physical documents) describing characteristics of a particular business interaction is often encountered in varied temporal order at central transaction locations that assemble these documents into logical packages for automated processing. For example, when a business interaction involves the sale of a product from a seller to a buyer, there are often multiple parties to the transaction in addition to the buyer and seller, such as shippers, financial institutions, distributors and regulatory agencies (e.g., customs, taxation agencies). Each of these parties often provides one or more different types of documents that relate to the transaction. Often, the documents are not in a format that is readily discernible relative to documents from other parties, requiring extensive effort to organize the documents into categories or transactions.

A variety of business transactions are particularly susceptible to processing difficulties such as those relating to document identification and categorization. For example, pre-payment reconciliation and auditing for a particular business transaction are often automatically carried out electronically at a central processor. Documents used for these functions can arrive at the central processor in either an untimely manner or a format that is unsuitable for identification and categorization of the documents into particular transactions. As another example, a customs clearance document referencing a particular invoice could arrive at a central processor before the invoice, which could also arrive before the actual order arrives. Without an invoice to tie the customs clearance document, the central processor has difficulty managing the document. Similarly, without an order to attribute an invoice to, the central processor may be unable to process the invoice (e.g., is unable to audit the invoice against the order).

Another type of incompatibility that has made transaction processing difficult is related to the common scenario wherein reference numbers used by different parties to identify a particular transaction are not compatible. For example, in transactions involving buyers and sellers, sellers maintain transaction data organized by reference numbers generated by the seller. Buyers typically must access the data using a seller's reference number rather than the buyer's reference number. In addition, buyers and sellers typically use different reference numbers for different characteristics of the transaction, making the monitoring and management of the transaction difficult.

As more and more documents are required to fully articulate business interactions, this problem of managing documents and other interaction data and, in particular, of correlating documents and other interaction data with a proper business transaction, becomes increasingly challenging. Manual parsing and categorization of these documents is expensive, time consuming and susceptible to error. Previously available automated approaches are generally limited in applicability to certain types of documents or certain inflexible methods of document identification and categorization.

Payment and billing related aspects of traditional transactions are particularly susceptible to billing errors and fraud. For example, there often is little to no connection between the delivery of goods and the billing for the delivery and/or the goods. This may result in double billing, no billing at all, or over billing. Auditing errors that cause incorrect billing or payment may also occur. In addition, payment can often be delayed while aspects of a particular transaction are being audited and/or disputed, particularly when different transaction documents must be manually parsed and processed. For example, documents from different parties to a transaction must often be parsed and compared to relate data from one document to another in a manner that will facilitate billing. Delay associated with billing reduces working capital resources for parties to the transaction waiting for payment.

Additional costs arise as a result of existing inefficiencies in a variety of transaction-processing approaches. Many of the costs are individually small, but very large in the aggregate. For example, typical parties to transactions incur administrative costs including those relating to the costs for creating and delivering transaction documents, resolving billing disputes, providing a signed copy of documents to other parties and posting accounts receivable. In addition, the cost of parsing, recognizing and categorizing documents related to these and other items add to the administrative costs of transactions.

An additional challenge to transaction management involves the inability to obtain immediate information regarding a transaction. Transaction data from one party is typically not readily available to other parties to the transaction without direct access to private-party systems. Since the process is largely conducted manually, it is very difficult to track a transaction and real-time data is particularly difficult to come by. For example, there are various manual steps involved in order to learn of the status of shipment or payment. If a shipper wants to know if a carrier delivered the goods for a particular transaction and if the payment has been made, the shipper often must contact the carrier and/or the appropriate financial institution.

The above and other difficulties in the management and coordination of business transactions have presented challenges to the effective and efficient management of business transactions.

SUMMARY

The present invention is directed to overcoming the above-mentioned challenges and others related to the types of approaches and implementations discussed above and in other applications. The present invention is exemplified in a number of implementations and applications, some of which are summarized below.

In one example embodiment of the present invention, transaction-based documents having data stored in attribute fields are parsed, with documents having matching attribute data in selected ones of the attribute fields being automatically grouped together as belonging to a common transaction. When two or more documents are thus grouped, a new anchor identification code for the common transaction is automatically generated and used to identify transaction-based documents that belong to the common transaction. With this approach, pre-defined transaction identification codes are not necessarily needed for grouping transaction-based documents together. In addition, as additional documents having matching attribute field data are received, they can further be automatically grouped into the common transaction using the new anchor identification code.

In another example embodiment of the present invention, a payment processing approach involves the automatic grouping of documents in a manner similar to that discussed in the previous paragraph. When order and invoice documents are received by a transaction processing arrangement and grouped as a function of common data in corresponding attribute fields, a payment process is initiated. Depending upon the particular implementation (e.g., programming selections made by parties to the transaction), payment for the invoice is controlled. For instance, where a buyer generating the order requires that payment authorization be given prior to release of funds for the invoice, the receipt of an authorization document with matching attribute fields is used to automatically generate a communication to a financial institution for effecting payment to the seller.

According to another example embodiment of the present invention, a transaction-processing system facilitates transactions involving merchant offerings among parties including buyers and sellers. Aspects of each transaction are characterized by transaction-based documents that are respectively provided by different parties to the transaction. A transaction databank uses a plurality of anchor locations, each anchor location being adapted to store a plurality of transaction-profile attributes that correspond to a particular transaction. A computer is programmed to identify attributes that define the common transaction, the identified attributes being carried by respective transaction-based documents as respectively provided from the different parties to the common transaction. Each of the different parties to the common transaction have different party-identifying attributes and are thus discernible. The computer is further programmed to automatically assign an anchor identification (ID) to each common transaction for which attributes carried by respective transaction-based documents have been identified. For each common transaction, the computer uses the identified attributes to construct a plurality of transaction-profile attributes in a particular one of the anchor locations identified by the anchor ID. When another transaction-based document carrying transaction-profile attributes for a particular one of the anchor locations is received, the computer uses the constructed transaction-profile attributes in the particular anchor location to advance progress toward completion of the common transaction for the particular anchor location.

The above summary of the present invention is not intended to describe each illustrated embodiment or every implementation of the present invention. The figures and detailed description that follow more particularly exemplify these embodiments.

BRIEF DESCRIPTION OF THE DRAWINGS

The invention may be more completely understood in consideration of the detailed description of various embodiments of the invention in connection with the accompanying drawings, in which:

FIGS. 5A-5C show various instances involving the receipt of electronic transaction information as represented in a table-type form, according to various example embodiments of the present invention and in which:

FIG. 5A shows an embodiment involving the receipt first of order document data, with seller identification with the order;

FIG. 5B shows an embodiment involving the receipt first of order document data with a subsequent invoice that references the order naming a different seller than listed on the order; and FIG. 5C shows an embodiment involving the receipt first of invoice document data that is devoid of buyer identification.

Figure 1:
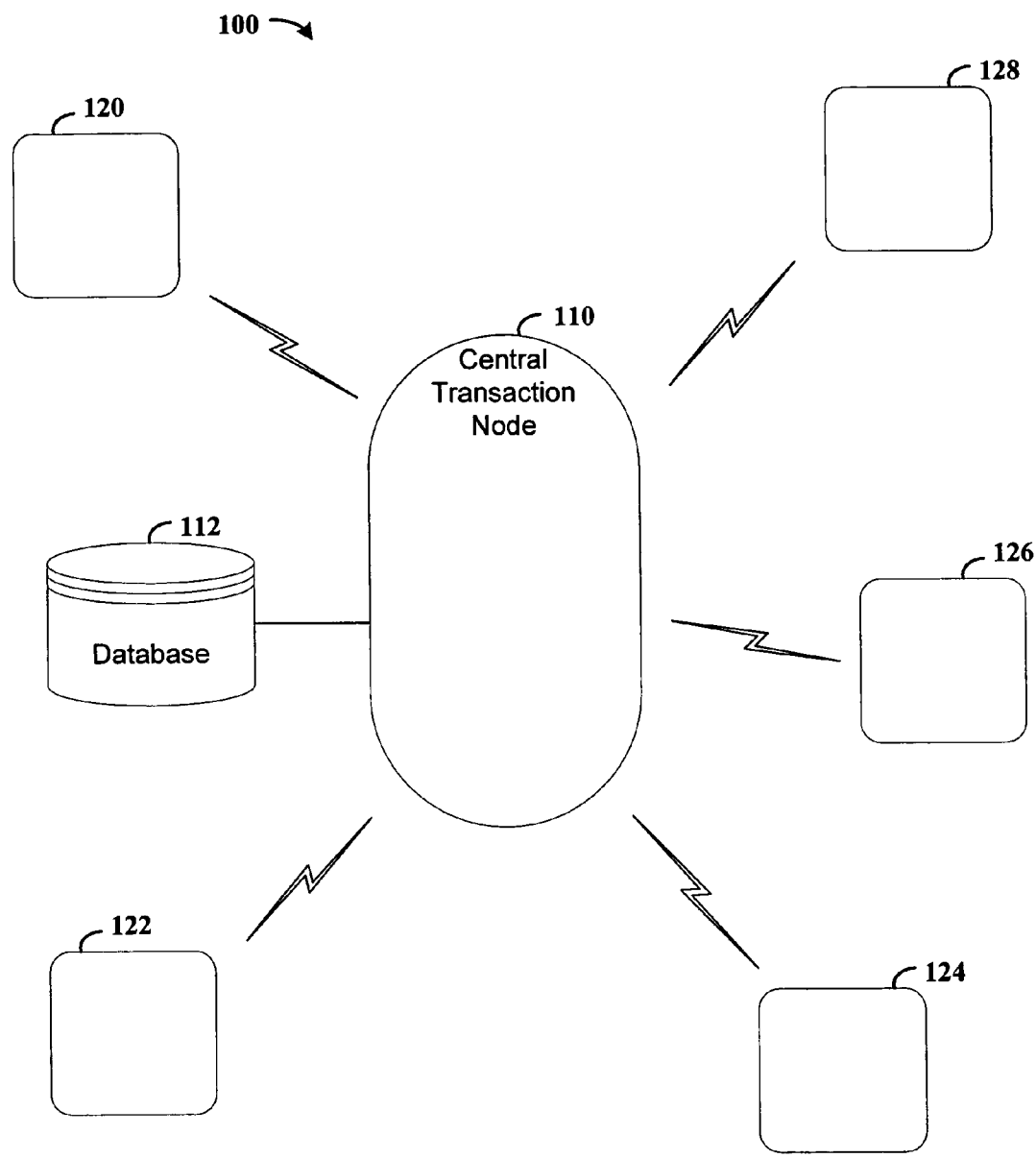
FIG. 1 shows a transaction processing arrangement, according to an example embodiment of the present invention.

While the invention is amenable to various modifications and alternative forms, specifics thereof have been shown by way of example in the drawings and will be described in detail. It should be understood, however, that the intention is not necessarily to limit the invention to the particular embodiments described. On the contrary, the intention is to cover all modifications, equivalents, and alternatives falling within the spirit and scope of the invention as defined by the appended claims.

DETAILED DESCRIPTION

The present invention is believed to be applicable to a variety of different types of business approaches and interactions, and has been found to be particularly useful for applications involving the processing of business transactions and related aspects thereof. While the present invention is not necessarily limited to such approaches, various aspects of the invention may be appreciated through a discussion of various examples using these and other contexts.

According to an example embodiment of the present invention, business interactions are managed using an approach that facilitates categorization of certain interaction data as a function of common characteristics of the data. Interaction data from multiple sources (e.g., two documents or a document and a stored profile) is parsed to identify attributes from the interaction data that are common to both sources. The common attributes are used to define a particular interaction category. Additional sources bearing the common attributes are accordingly grouped into the particular interaction category. With this approach, business interaction data is automatically categorized into groups that can be used to identify documents and other business interaction data that belongs to a particular business interaction. This categorization can be further used, for example, in authorizing or otherwise effecting payment for a particular transaction.

In one implementation, an automated discovery process involves the use of predefined data fields for the identified attributes to discover a new identification number to assign to a particular transaction. These predefined attribute fields in documents are parsed and data therein is used to create the new identification number. With this approach, an identification number or code for a particular business transaction does not necessarily need to be predefined; rather, documents including data relative to the transaction are automatically parsed and used to create the identification.

According to another example embodiment of the present invention, a transaction-processing system includes a database having an anchor location for storing transaction-profile attributes that correspond to a particular transaction and are adapted to categorize transaction data using the transaction-profile attributes. Selected ones of the transaction-profile attributes are used to form anchor data that identifies the particular transaction. This anchor identification (ID) data is used to label transaction data stored and developed in the anchor location (with the anchor location including, e.g., one or more locations in a database).

In one implementation, the anchor data has an actual physical representation in the database at the anchor location (or address), and thus can be used to access documents stored in the database and identified by the anchor. In one implementation, configuration tables are used to enable parties to a transaction to define data elements of the documents that are to be used to automatically relate documents to one other. Using this approach, the anchor data can effectively be used to broadcast criteria that will allow individual transactions to latch on to a particular business interaction represented by given anchor data.

In another particular example embodiment of the present invention, certain data attributes, documents and identifications are implemented by a central processor to group business transactions that are common to a particular business interaction between transaction parties such as a buyer and seller. For example, when a first document received by the central processor is Invoice "123" from Seller "S1" naming Order "ABC" from Buyer "B1" as the justification for the billing, the central processor responds by searching a central database. Based on the search (e.g., a logical key search or an algorithm-based search) of the central database, the central processor determines whether it has any previous knowledge of a business interaction with the four unique attributes "123," "S1," "ABC" and "B1." When no previous knowledge of such a business interaction is found, the central processor creates an anchor having AnchorID "A1" with anchor vector data from the first document (DOC1) being stored in the central database, as shown in Table 1.

TABLE 1

| ATTRIBUTE | DOC1 |
|---|---|
| AnchorID | "A1" |
| Named Buyer | "B1" |
| Named Seller | "S1" |
| Named Order | "ABC" |
| Named Invoice | "123" |
| Source Document Owner | "S1" |
| Source Document Owner Type | Seller |
| Source Document Type | Invoice |
| Source Document ID | "123" |
| Reference Document Owner | "B1" |
| Reference Document Owner Type | Buyer |
| Reference Document Type | Order |
| Reference Document ID | "ABC" |

When either Buyer "B1" or Seller "S1" queries the central database looking for either Invoice "123" or Order "ABC," the party performing the query sees that the central processor is aware of the invoice but has no other documentation.

Further regarding this example, when a second document received by the central processor is Receipt "R789" from Buyer "B1" naming Order "ABC," the central processor parses the data to determine whether it has any previous knowledge of a related business interaction. Data from the second document (DOC2) is shown in Table 2 below.

TABLE 2

| ATTRIBUTE | DOC1 | DOC2 |
|---|---|---|
| AnchorID | "A1" | |
| Named Buyer | "B1" | "B1" |
| Named Seller | "S1" | |
| Named Order | "ABC" | "ABC" |
| Named Invoice | "123" | |
| Source Document Owner | "S1" | "B1" |
| Source Document Owner Type | Seller | Buyer |
| Source Document Type | Invoice | Receipt |
| Source Document ID | "123" | "R789" |
| Reference Document Owner | "B1" | "B1" |
| Reference Document Owner Type | Buyer | Buyer |
| Reference Document Type | Order | Order |
| Reference Document ID | "ABC" | "ABC" |

In this instance, the central processor aligns the attributes from DOC2 against the anchor vector data and finds that the attributes Reference Document Owner "B 1," Reference Document Type "Order" and Reference Document ID "ABC" are already known. The central processor is programmed to use these matched attributes to recognize that Receipt "R789" is describing another aspect of the same business interaction as is Invoice "123" and to assign the receipt's attributes to AnchorID="A1" as shown in Table 3 below (with matched attributes in bold).

TABLE 3

| ATTRIBUTE | DOC1 | DOC2 |
|---|---|---|
| AnchorID | "A1" | "A1" |
| Named Buyer | "B1" | "B1" |
| Named Seller | "S1" | |
| Named Order | "ABC" | "ABC" |
| Named Invoice | "123" | |
| Source Document Owner | "S1" | "B1" |
| Source Document Owner Type | Seller | Buyer |
| Source Document Type | Invoice | Receipt |
| Source Document ID | "123" | "R789" |
| Reference Document Owner | "B1" | "B1" |
| Reference Document Owner Type | Buyer | Buyer |
| Reference Document Type | Order | Order |
| Reference Document ID | "ABC" | "ABC" |

With this approach, when either Buyer "B1" or Seller "S1" queries the central processor for Invoice "123," Order "ABC" or Receipt "R789," the central processor can immediately display both the Invoice and the Receipt. The party performing the query can see when the documents were issued, when they were submitted to the central processor and/or other information related to the documents, depending upon the type of information the central processor is programmed to store.

When a third document, Order "ABC" from Buyer "B1" naming Seller "S1," is presented to the central processor, the document is parsed to determine whether it includes any information regarding a related business interaction having attributes stored in the central database. The central processor aligns the attributes from the third document (DOC3) against the anchor data and finds that the attributes Buyer "B1," Seller "S1" and Order "ABC" are already known as shown below in Table 4 (with matched attributes in bold).

TABLE 4

| ATTRIBUTE | DOC1 | DOC2 | DOC3 |
|---|---|---|---|
| AnchorID | "A1" | "A1" | |
| Named Buyer | "B1" | "B1" | "B1" |
| Named Seller | "S1" | | "S1" |
| Named Order | "ABC" | "ABC" | "ABC" |
| Named Invoice | "123" | | |
| Source Document Owner | "S1" | "B1" | "B1" |
| Source Document Owner Type | Seller | Buyer | Buyer |
| Source Document Type | Invoice | Receipt | Order |
| Source Document ID | "123" | "R789" | "ABC" |
| Reference Document Owner | "B1" | "B1" | |
| Reference Document Owner Type | Buyer | Buyer | |
| Reference Document Type | Order | Order | |
| Reference Document ID | "ABC" | "ABC" | |

Using the matching attribute information in these fields, the central processor can assign Order "ABC" from Buyer "B1" to anchor "A1" as illustrated below in Table 5 (with matched attributes in bold).

TABLE 5

| ATTRIBUTE | DOC1 | DOC2 | DOC3 |
|---|---|---|---|
| AnchorID | "A1" | "A1" | "A1" |
| Named Buyer | "B1" | "B1" | "B1" |
| Named Seller | "S1" | | "S1" |
| Named Order | "ABC" | "ABC" | "ABC" |
| Named Invoice | "123" | | |
| Source Document Owner | "S1" | "B1" | "B1" |
| Source Document Owner Type | Seller | Buyer | Buyer |
| Source Document Type | Invoice | Receipt | Order |
| Source Document ID | "123" | "R789" | "ABC" |
| Reference Document Owner | "B1" | "B1" | |
| Reference Document Owner Type | Buyer | Buyer | |
| Reference Document Type | Order | Order | |
| Reference Document ID | "ABC" | "ABC" | |

With this approach, whether Buyer "B1" or Seller "S1" queries on Invoice "123," Order "ABC" or Receipt "R789," the central processor can immediately display the Invoice, the Receipt and the Order. The party performing the query can see when the documents were issued, when they were submitted to the central processor and any other information stored in the database that is related to the business interaction. In this regard, Buyer "B1" need not necessarily know the attribute types that Seller "S1" uses in order to access documents that originate from Seller "S1."

Once documents have been associated through the anchor "A1," processing logic can be applied to perform a variety of transaction-related operations. For example, the Receipt "R789" can be used to validate that received quantity resources at a line item level have been added to the data attributed to anchor "A1." The Order "ABC" can be used to validate that the ordered quantity and order amount resources at the line item and document header levels have been attributed to anchor "A1." The Order "ABC" can also be used to evaluate whether there are sufficient "ordered and received" quantity and amount resources available to fulfill the listed invoice "123."

In one implementation, the central processor uses exception rules that restrict each anchor to the types of data and/or documents that can be assigned to it. For instance, anchors can be restricted to having one and only one order; if a particular order number were to name a seller that is different than a seller already stored under an existing AnchorID to which the order number already belongs, the central processor creates a new anchor. This new anchor is assigned attribute data including common data already stored under the existing AnchorID (e.g., common receipt data for an order naming more than one seller, with the receipt's natural target being the order). Relationships between such related anchors can be stored, for example, in tables accessible by the central processor.

In another implementation, the central processor is programmed (e.g., using an algorithm) to modify anchors if any of the documents leave the anchor due to changes in the attributes used to associate the documents for processing purposes. For instance, if a particular buyer's user profile attributes change, documents related to the particular buyer and having attributes stored under a particular anchor may be purged.

In another particular example embodiment, a group of attributes is used to link documents together for a particular business transaction. Using Table 5 above as a reference, one important set of attributes for this embodiment includes the following: Named Buyer, Named Seller, Named Order, Named Invoice, Source Document Owner, Source Document Owner Type, Source Document Type and Source Document ID. The values in these attribute fields are used to effectively create a link between the documents involving the anchor. For instance, a match between a selected number of attributes in these attribute fields can be used to relate the documents together. The anchor can then be implemented in a manner that is based upon the matching attributes as well as other attributes specific to each particular document.

The first four of these above-discussed attributes are used to identify certain interaction identifiers while the last four are used to differentiate different documents that reference a particular business interaction. Each of these attributes can be identified using a variety of approaches. For instance, the Named Buyer, Named Seller and Source Document Owner attributes may include a code/value pair such as customer number and corresponding value associated with that customer number (e.g., "customer number/XXYYZZ"). The Named Order attribute may be a simple order number and/or may include an order issue date. The Named Invoice attribute may include an invoice number and the Source Document Owner Type, Source Document Type and Source Document ID would similarly include a simple number corresponding to a defined type or particular identification number.

Referring now to FIG. 1 as an example, a transaction processing arrangement 100 automatically groups transaction data as a function of predefined anchor-type categories and related information in the transaction data, according to another example embodiment of the present invention. The transaction processing arrangement 100 includes a central transaction node 110 that is a central location for the communication and processing of transaction-related data. The central transaction node 110 is in communication with a database 112 where transaction-related information is stored in anchor locations. The database 112 is shown coupled to the central transaction node 110; however, in various implementations, some of or the entire database is part of the central transaction node, is located at a remote location and/or includes a plurality of data storage circuits at different locations.

A plurality of user nodes 120, 122, 124, 126 and 128 are communicatively coupled with the central transaction node 110. The user nodes 120-128 may, for example, include one or more of a buyer, seller, distributor, shipper, carrier, customs agency, national security agency, financial institution or other type of individual, group or agency that would typically be involved in a transaction. These nodes can interact with the central transaction node 110 for providing transaction-related information, such as orders, invoices, shipping documents, payment authorization, payment execution, customs documents, security documents and others. This transaction-related information is parsed and grouped by the central transaction node 110 using common attributes to automatically group information from a particular transaction together, for example as discussed above in connection with the tables.

In one implementation, the central transaction node 110 is further adapted to grant and control information exchange with the database 112 as a function of inputs received from the nodes 120-128, such as authorization inputs and document-specific inputs. When users at one of the nodes 120-128 attempt to send information to or retrieve information from the central transaction node 110, authorization information from the users is used to control the information transfer. The authorization information may include, for example, access-type information (e.g., a password or user ID) or simply document information that the central transaction node 110 recognizes.

When information exchange is controlled with document information and one of the nodes 120-128 sends transaction data (e.g., an electronic document) to the central transaction node 110, the database 112 is parsed to match the transaction data with stored information. If a match is found, the central transaction node processes the matching data to determine whether the received transaction data belongs to the same transaction as the matching data. If so, the received transaction data is assigned an anchor ID pertaining to the matching data and is stored in the database 112 with the assigned anchor ID grouping the matching data together.

If a match is found but there are restrictions, the central transaction node processes the received data according to restriction rules, if any, programmed to the central transaction node. For example, where one anchor ID is assigned for each invoice and when there is an existing invoice in the database 112 under the matching anchor ID, a new anchor ID is created. The received transaction data as well as matching data that is unrestricted are stored under the new anchor ID. For instance, when matching order data has been found but the order includes more than one invoice, a different anchor ID is created for each invoice, both including the same order but having separate invoices. These and other restrictive-type approaches are programmed to the central transaction node, depending upon the implementation.

If no match is found between received transaction data and data in the database 112, a new anchor ID is created for the received transaction data. This new anchor ID, along with the received transaction data, is stored in the database 112 and thus establishes a new transaction. When additional transaction data matching the newly-stored data is subsequently received, the central transaction node processes the matching data as discussed above.

In another implementation, transaction data received at the central transaction node 110 is cross-referenced with security-type data stored in the database 112. When transaction data matches certain security-controlled criteria, the transaction to which the transaction data belongs can be flagged or otherwise audited, for example, by government-type agencies. For instance, where a product identification type matches a product type that is susceptible to import/export control, the transaction may be halted for auditing and approval by a third party. Such approval may, for example, also take the form of a transaction document that is sent to the central transaction node 110, where the approval is used to further the transaction (i.e., allow goods to be imported/exported).

In another instance, where transaction data matches a data type that is restricted for security purposes, the transaction may similarly be halted for auditing and approval by a third party. For example, where the transportation of certain goods is restricted for safety purposes, the transaction may be prevented until appropriate transportation has been arranged. As another example, where a transaction would involve a transfer of funds that is deemed potentially harmful (e.g., with funds going to a terrorist group), the transaction can similarly be halted.

In another implementation, third-party interaction with transaction data processed by the central transaction node is used to audit exchange-rate information. For example, when the transaction documents include information regarding a particular currency to use, third-party exchange rate documents can be matched to the transaction documents. This match is used to automatically assign exchange rate information to individual transactions.

The central transaction node 110 is readily adapted to perform one or more of a variety of functions using the data stored in anchor locations. For example, in one implementation, the central transaction node is programmed to automatically monitor transaction data stored in the database 112 and to carry out actions in response to certain characteristics of the transaction data. For example, when transaction data in an anchor location identifies a fulfillment status of an order, the fulfillment status can be processed and used for furthering a transaction to which the transaction data applies.

In another implementation, the central transaction node 110 is programmed to automatically classify expense information represented by data stored in anchor locations in the database 112. For example, when the transaction data includes expense data, the central transaction node 110 parses the expense data and automatically identifies and categorizes the expense data. The categorization information is optionally sent to parties to the transaction to which the expense data applies. In addition, parties having transaction information in a plurality of anchor locations in the database 112 can use this expense classification to monitor and report characteristics of transactions managed by the central transaction node 110.

In another implementation, the central transaction node 110 is adapted to automatically generate and deliver interface information (e.g., documents) to users who are parties to a transaction represented by information in the database 112. For example, transaction data related to financial information for the transaction can be used in the generation of accounting process interface documents. This interface information is provided to one or more of the parties to the transaction for which the interface documents were generated.

In still another implementation, the central transaction node 110 is adapted to perform cyclic operations for repetitive transactions. Such repetitive transactions may include, for example, recurring payments such as loan payments, installment payments or rental payments. The central transaction node 110 generates transaction data on a repetitive basis and stores the transaction data in an anchor location in the database 112 for which the data is generated. Using an invoice as an example, the central transaction node 110 may generate an invoice for a cyclic payment in this manner. The invoice is stored in the database 112 for use in furthering the transaction process (e.g., when payment data is received, the central transaction node 110 can update the invoice to a paid status).

Figure 2:
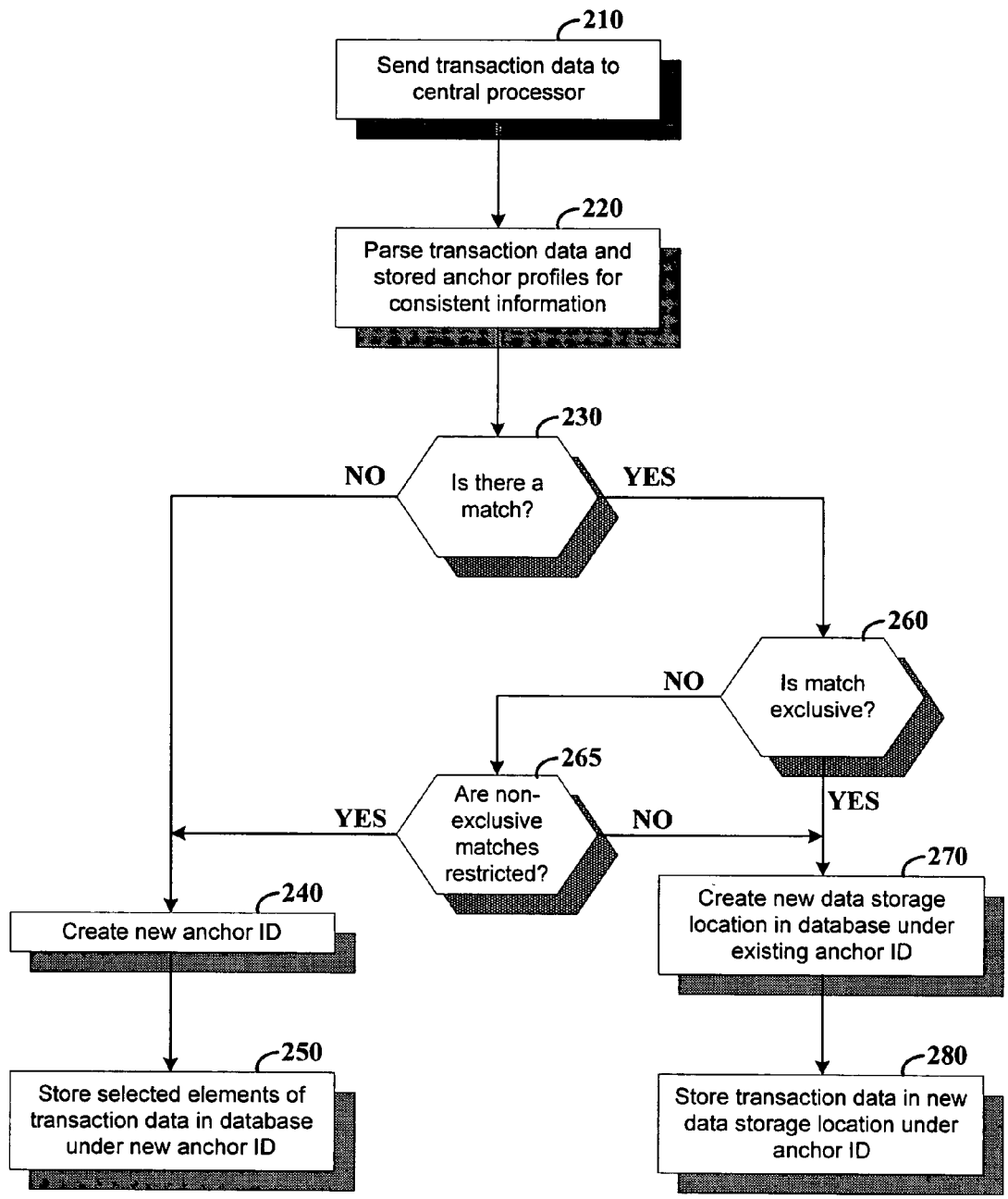
FIG. 2 is a flow diagram showing an approach for transaction management, according to another example embodiment of the present invention.

FIG. 2 is a flow diagram showing an approach for the automated grouping of data into transaction-specific groups, according to another example embodiment of the present invention. At block 210, data for a transaction between two or more parties is sent to a central processor having access to a database with stored anchor profiles including transaction-related information. The transaction data and anchor profiles are parsed to identify consistent (e.g., matching) information by the central processor at block 220. If there is no match between the transaction data and the anchor profiles at block 230, a new anchor ID is created at block 240. Selected elements of the transaction data that can be used for correlating different types of transaction data with a particular transaction are then stored in the database under the new anchor ID at block 250.

If there is a match between the transaction data and the anchor profiles at block 230, the central processor further determines whether the match is exclusive at block 260. Such a match determination may determine, for example, whether similar transaction data also matches the profile information, such as in the case where two invoices match particular profile information including a single order. If the match is exclusive at block 260, a new data storage location is created in the database under the existing anchor ID at block 270. The transaction data is then stored in the new data storage location under the anchor ID, which facilitates the organized storage and management of a variety of data for a particular transaction. For instance, using this approach, an electronic document including the transaction data is "labeled" with the anchor ID and then stored in a file location including other documents "labeled" with the anchor ID.

If a match is found at block 230 but is found to be nonexclusive at block 260, the central processor determines whether non-exclusive matches are restricted at block 265. This restriction is established, for example, by profile information for participants in transactions having anchor profiles in the database and allows the participants to tailor the breadth of a particular anchor ID. For instance, if participants find it acceptable to store multiple invoices for a single order under the same anchor ID label, non-exclusive matches are not restricted. If the non-exclusive match is not restricted at block 265, the process continues at blocks 270 and 280 with a new data storage location being created under an existing anchor ID and the transaction data being stored therein. If the non-exclusive match is restricted at block 265, a new anchor ID is created at block 240 and selected elements of the transaction data are stored in the database under the new anchor ID at block 250.

Figure 3:
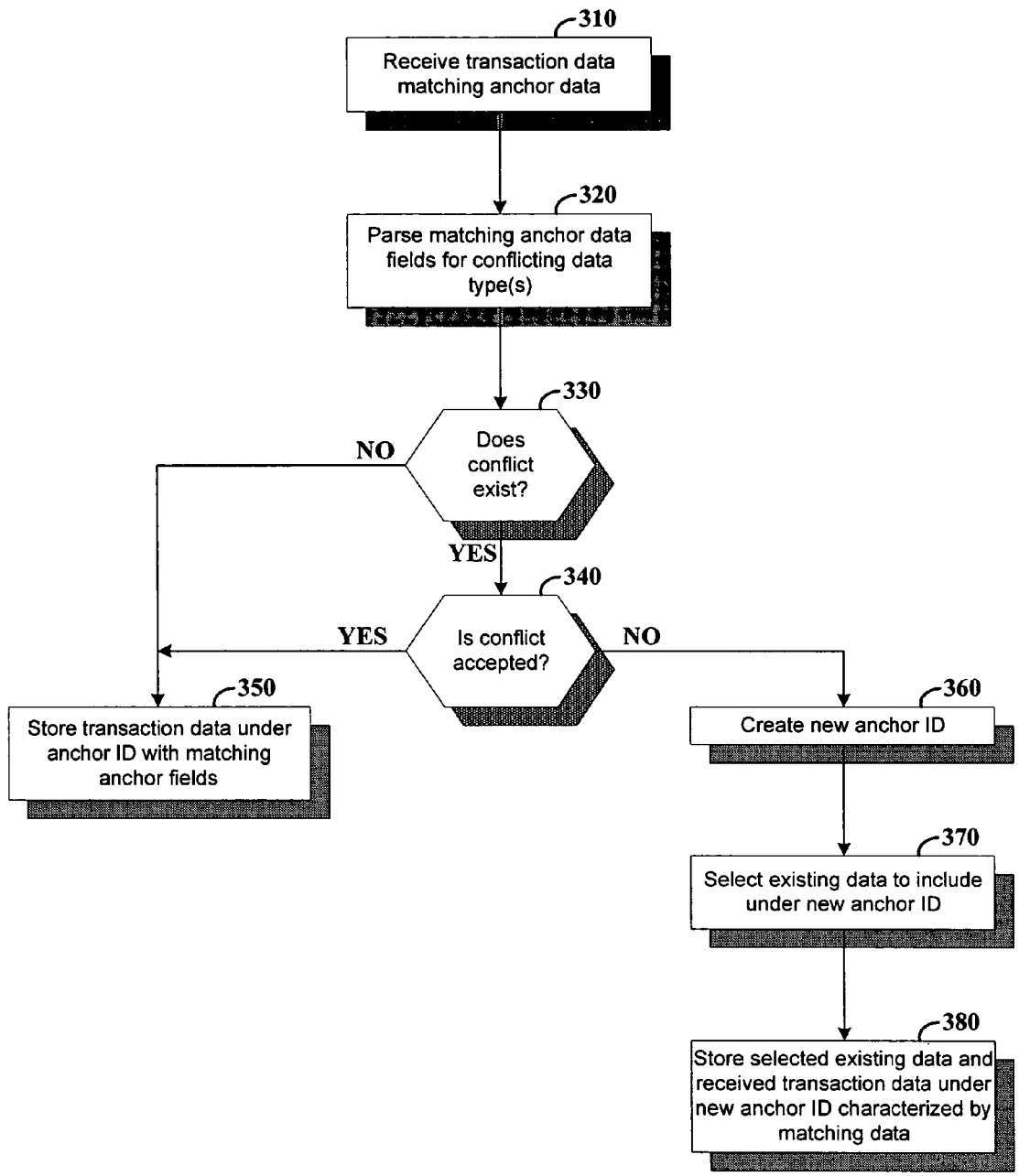
FIG. 3 is another flow diagram, related to the flow diagram shown in FIG. 2, for an approach where non-exclusive anchor data matches are restricted, according to another example embodiment of the present invention.

FIG. 3 is a flow diagram showing an approach for processing and restricting data, according to another example embodiment of the present invention. This approach may, for example, be useful when matching anchor data is found in a database and involves different transactions, for example wherein different transactions share certain similar data. In addition, this approach may be useful in connection with other embodiments discussed herein, such as that shown and discussed in connection with FIG. 2 and block 265 regarding exclusive matches.

At block 310, a transaction-processing computer receives transaction data that matches anchor data stored in a database. The computer parses the matching anchor data fields for conflicting data types at block 320. These conflicting data types may, for example, include a data type that is restricted to one document per anchor, such as a data type indicating that a document is an invoice when only one invoice per anchor is desired. This approach is useful, for example, when more than one invoice is on a particular order in the anchor but the maintenance of separate anchor locations for separate invoices is desirable. For instance, when a first order and the invoice both have information stored in the anchor location and the transaction data for a second invoice on the same order is received, separate anchor locations are created for the first and second invoice, with redundant order data in both anchor locations.

If no conflict is found at block 330, the transaction data is stored under an anchor ID with matching anchor fields at block 350. Similarly, if a conflict is found at block 330 but the conflict is accepted at block 340, the transaction data is also stored under an anchor ID with matching anchor fields at block 350. Examples of accepted conflicts may include, for example, conflicts involving more than one invoice for a particular order where the particular anchor data is configured to accept multiple invoices under the same anchor ID. The anchor ID of the matching anchor fields thus identifies the transaction data.

If a conflict is found at block 330 and not accepted at block 340, a new anchor ID for a new anchor data location is created at block 360. Certain anchor data from the existing anchor data location is selected at block 370 and stored, along with the received transaction data, at block 380 under a new anchor ID for the new anchor data location. With this approach, data in an existing anchor location is used to establish data for a new anchor location for grouping with data from other transaction-based documents. Optionally, the new anchor location simply points to the existing anchor location for reference to particular data common to both anchor locations, thereby reducing redundancy and saving data storage space.

Referring again to FIG. 3 and using the example of a common order for multiple invoices as discussed above, existing data from the common order for two (or more) invoices would thus be stored in both the existing and new anchor data locations. Received transaction data from a transaction-based document including invoice data would also be stored in the new anchor data location when invoice data from a different transaction-based document is already stored in the existing anchor location.

Figure 4:
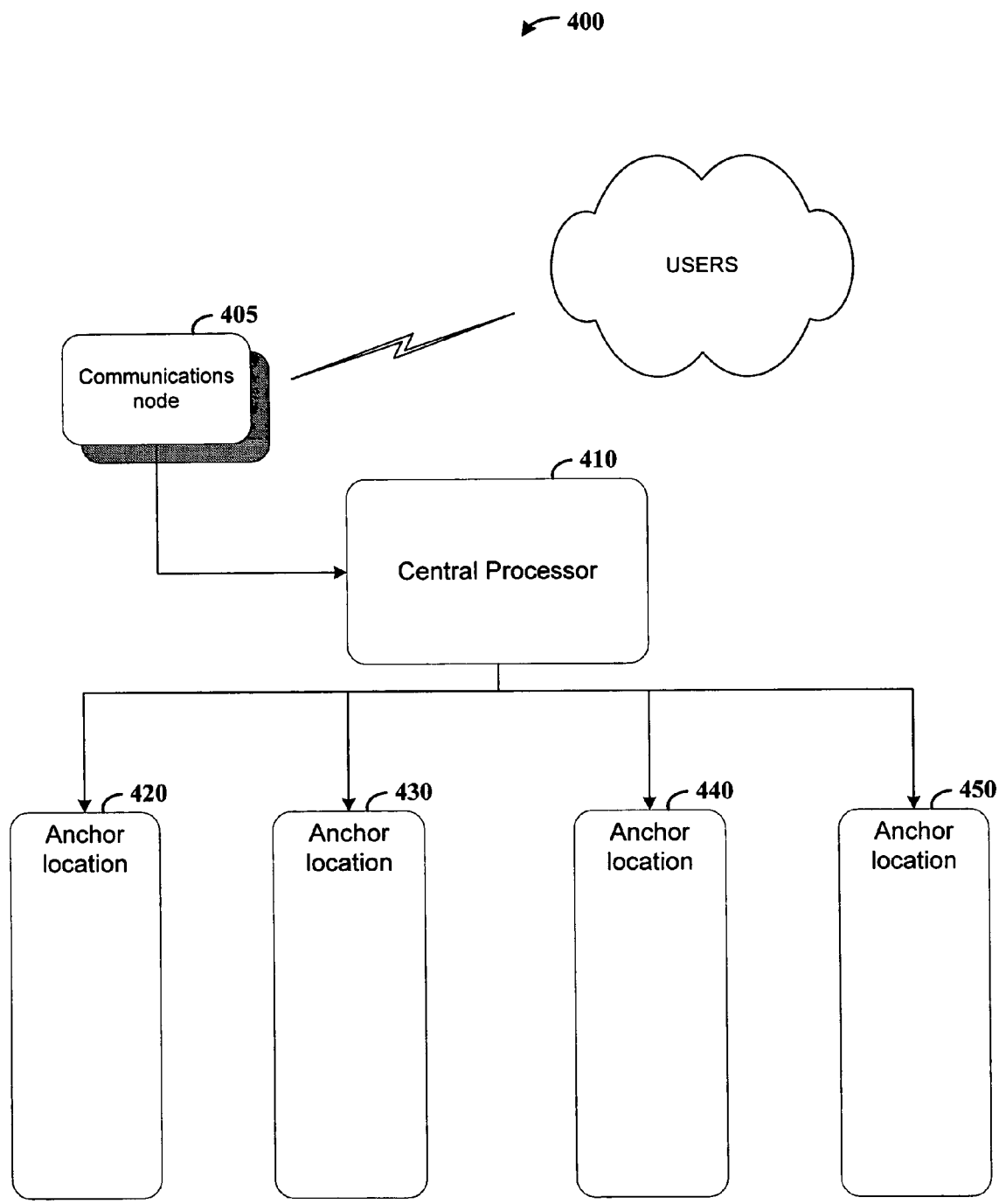
FIG. 4 is a block diagram showing an arrangement for automatically grouping and processing transactions, according to another example embodiment of the present invention.

FIG. 4 is a block diagram showing an arrangement 400 for automatically grouping and processing transactions, according to another example embodiment of the present invention. A central processor 410 receives transaction documents from a communications node 405 that receives the transaction documents from a plurality of users. The users communicate with the communications node 405 using, for example, a computer network, the Internet, telephony networks or conventional paper-based communications.

When a transaction document is received, the central processor 410 parses the document and a plurality of anchor locations 420, 430, 440 and 450 to identify whether there is common transaction information sufficient to establish a relationship between the data in the document and the data stored in the anchor locations. Sufficient information may be defined, for example, by certain data fields in both the document and an anchor location that have matching data as discussed in connection with the various tables above.

Upon finding sufficient common transaction information in a particular one of the anchor locations 420-450, the central processor stores the transaction document in the particular one of the anchor locations, optionally adding an anchor ID for the anchor location to the document. For example, if sufficient transaction information in anchor location 420 matches transaction information in the document, the document is stored in anchor location 420 and optionally labeled with an anchor ID associated with the anchor location 420.

Upon finding sufficient common transaction information in more than one of the anchor locations 420-450, the central processor compares the relationships between the document and each of the anchor locations having common transaction information. These compared relationships are used to identify one or more of the anchor locations in which to store information from the document. For instance, if the document is an order document that pertains to two or more invoices stored in different anchor locations, data from the document is stored in both locations.

In another instance, if the compared relationship identifies a closer match between the document and a particular anchor location, relative to matches between the document and other anchor locations, the document is stored in the anchor location exhibiting the closer match. For instance, where more than one anchor location has data that matches a predefined number of data fields in the document, each anchor location may meet criteria for establishing sufficient common transaction information with the document. However, when one of the anchor locations has data that matches more data fields than other ones of the anchor locations, the anchor location with more matching data fields is identified as having a closer match with the document.

Upon finding sufficient transaction information in one of the anchor locations 420-450 but also detecting a conflict that would restrict the document from being stored in the anchor location, the central processor stores the document in an empty anchor location. The document is optionally stored along with data from one or more documents found in the anchor location including sufficient common transaction information (e.g., as discussed above with the example involving two invoices for a single order). If one of the anchor locations 420-450 is not empty, a new anchor location is created and the document is stored in the new anchor location.

If sufficient common transaction information is not found in any of the anchor locations 420-450, the central processor stores the document in an empty anchor location. If one of the existing anchor locations 420-450 is not empty, a new anchor location is created and used for storing the document. When a subsequent document that includes sufficient common transaction information with the first document is received by the central processor 410, it is stored in the same location as the first document and thus creates an anchor location having common attributes defined by both documents.

Figure 5C:
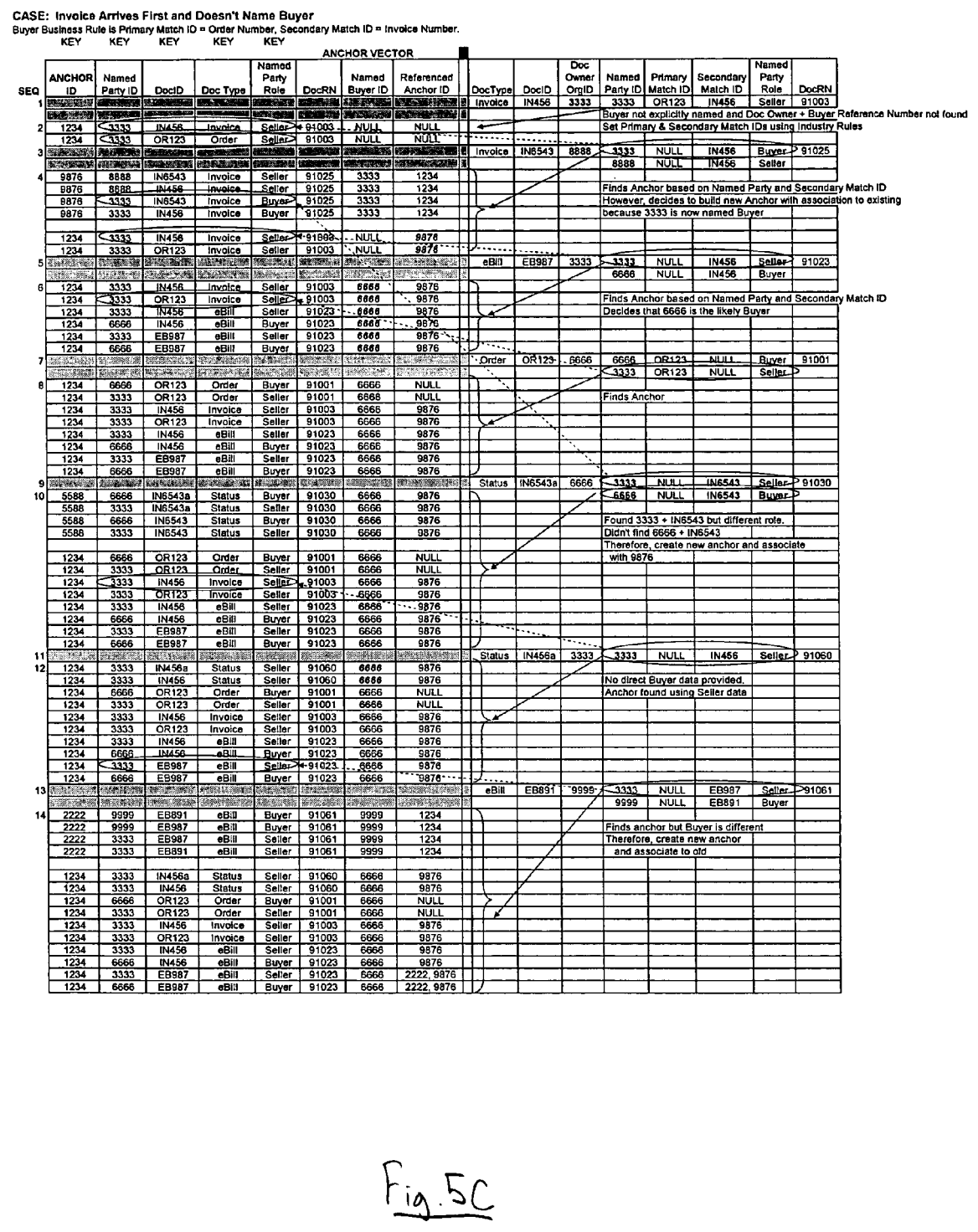

FIGS. 5A-5C each show instances involving the receipt of electronic transaction information under a particular condition, with data being represented in a table-type form, according to various example embodiments of the present invention. These instances shown in FIGS. 5A-5C may be processed and otherwise carried out using, for example, one or more of the approaches discussed above and/or shown in the accompanying figures.

In each of FIGS. 5A-5C, documents are shown as being received in a sequence represented by descending numbers in a column near the left-hand side of each figure, each sequence including one or more rows of data. Referring to FIG. 5A as an example, sequences 1-14 (SEQ 1-14) are shown corresponding to rows as labeled on the left of a table, each sequence representing one or more columns in the table. These sequences represent events that happen in a generally temporal order, beginning at SEQ 1 and ascending to SEQ 14. Various columns are also labeled to show the type of data included in each column, as received in the sequence shown. Data in the left-most columns of the table (with shaded areas) is used to make up anchor vector data that can be implemented for assigning definition to document data that pertains to a particular transaction (e.g., as discussed above). Data in the right-most columns of the table (without shaded areas) represents electronic document data that is received and processed in connection with anchor information in the left-most columns of the table. The remaining figures are arranged in a manner similar to this as discussed in connection with FIG. 5A.

For brevity, many of FIGS. 5A-5C use abbreviated column headings. The following is a list of those headings with corresponding description:

| HEADING ABBREVIATION | DESCRIPTION |
| --- | --- |
| DocRN | document reference number |
| DocType | document type |
| DocID | document identification |
| DocOwnerOrigID | document owner/originator ID |

A brief explanation of the types of documents the above-referenced abbreviations can be used for is as follows. The DocRN is typically a number that references a particular document. DocType is typically used to identify a type category for a particular document, such as an invoice or an order. DocID is typically a unique identification, such as an order number or an invoice number, which pertains to a particular document. The issuing party of a particular document controls the DocID, such that the issuing party can use the DocID as a known reference point for finding related transaction documents. DocOwnerOrigID is typically used to indicate a unique identification for the owner and/or originator of the particular document to which it is applied.

Continuing with FIG. 5A, business rules for this embodiment set an order number as a primary match ID for an anchor and further set an invoice number as a secondary match ID for the anchor. The primary and secondary match IDs are used for matching documents (electronic document data), with order numbers used as a primary criterion for matching and relating data. In this instance, a transaction-related document including order document data is received first, having DocID "OR123" and being owned by the named party "Buyer" having DocOwnerOrigID "5555." That is, the buyer places an order that lists an order number and the buyer's ID (5555), and further includes a seller's ID "3333" (shown in the second row of the two rows labeled under "SEQ 1"). The order "OR123" document is assigned DocRN "91001," and information from the order is placed in corresponding columns under the anchor vector having Anchor ID "1234" in the leftmost portion of the table during a second sequence "SEQ 2."

During a third sequence (SEQ 3), a transaction-based document (invoice document having DocID "IN456") is received from seller "3333" referencing order number "OR123" as the Primary Match ID and is assigned DocRN "91003." Now, two documents having a common order number ("OR123") have been received at SEQ 1 and SEQ 3. These documents are used to find an anchor match that identifies the transaction. In this regard, the anchor relating to these two documents (and their corresponding transaction) has a primary match ID that includes order number "OR123" and a secondary match ID that includes invoice number "IN456." For illustration, a circled portion of the data received in SEQ 3 is shown with a dashed arrow pointing back to corresponding data stored under the anchor vector in SEQ 2. Similar correspondence is shown between subsequently-received data as discussed further below. Data received at SEQ 3 is combined with data stored at SEQ 2 as shown in SEQ 4.

During SEQ 5, a third transaction-based document is received from seller "3333" in the form of an electronic bill (eBill), essentially mirroring the invoice document "IN456" received during SEQ 3 (also referencing order "OR123" and buyer "5555"), and is assigned DocRN "91023." Data in the eBill matches that stored for the anchor "1234" and is accordingly stored under Anchor ID "1234" at SEQ 6.

During SEQ 7, another transaction-based document ("IN6543") is received (and assigned DocRN 91025) in the form of an invoice naming a seller having Party ID "8888" and buyer having Party ID "3333." For this transaction-based document "IN6543," the seller named in SEQ 1 through SEQ 6 (seller "3333") is now a buyer. In this regard, the Party ID data for the buyer matches the Party ID for the seller in the transaction for Anchor ID "1234"; however, the matching Party ID is for a different party role (buyer rather than seller). In this regard, a new Anchor ID "7654" is created for the data received in SEQ 7, and the data is stored in SEQ 8 under the new Anchor ID "7654." In SEQ 8, the data stored under Anchor ID "7654" is also assigned reference Anchor ID "1234" to indicate that a common ID ("3333") of the data that corresponds to the previously-stored anchor information under ID "1234." Correspondingly, data stored under Anchor ID "1234" is assigned reference Anchor ID "7654" in SEQ 8. Data assigned to Anchor ID "1234" as stored in SEQ 6 is carried over to SEQ 8 and stored with information for the new reference Anchor ID "7654." With this approach, queries for information made under either Anchor ID "1234" or Anchor ID "7654" reference the other anchor(s) for which the buying/selling party having Party ID "3333" is a party.

In SEQ 9, a status document having DocID "IN6543a" is received, assigned DocRN "91030" and matched to the anchor having Anchor ID "7654" using matching criteria including buyer Party ID "3333" and Secondary Match ID "IN6543." Information from this status document, as well as previously received information received at SEQ 7, is stored and/or updated under Anchor ID "7654" at SEQ 10. Such a status document may be implemented, for example, to update anchor information for such instances where certain data matches more than one Anchor ID, with the corresponding data stored as shown in SEQ 10 being for a single Anchor ID (in this instance, Anchor ID "7654").

In SEQ 11, another status document having DocID "IN456AB" is received and assigned DocRN "91060." Information from this status document, as well as previously received information assigned Anchor ID "1234" is stored under Anchor ID "1234" at SEQ 12 using matching criteria including seller Party ID "3333" and Secondary Match ID "IN456." In this regard, the status document "IN456AB" is used similarly to status document "IN6543a" in that data stored at SEQ 12 belongs to a single anchor (Anchor ID "1234") but is stored with reference to Anchor ID "7654" due to the matching buyer/seller ID "3333."

At SEQ 13, a second eBill having DocID "EB891" is received and assigned DocRN "91061." This eBill references eBill "EB987" (received at SEQ 5) as well as Party IDs "5555" and "3333" for buyer and seller, respectively, and is assigned Anchor ID "1234" as corresponding to the transaction involving buyer "5555" and seller "3333." Corresponding data is stored under Anchor ID "1234" at SEQ 14, again with reference to Anchor ID "7654."

The following discussion of the embodiments shown in FIGS. 5B-5C involves similar characteristics to those described above in connection with FIG. 5A. In this regard, certain description has been omitted for brevity, with the understanding that approaches including those discussed above may be implemented in connection with these figures.

Referring now to FIG. 5B, the embodiment shown involves the receipt first of order document data with the subsequent receipt of an invoice that references the order naming a different seller than listed on the order. At SEQ 1, an order "OR123" is received from a buyer naming the buyer "6666" and seller "3333," and the information with "OR123" is stored under Anchor ID "1234" in SEQ 2.

Invoice "IN222" is subsequently received from seller "4444" at SEQ 3, naming "OR123" but referencing a different seller (seller "4444"). The information in the invoice "IN222" is stored under a new Anchor ID "5678" with reference to the anchor "1234" also made due to the common order "OR123" listed under both anchors. Under anchor "5678," the DocID for "OR123" received at SEQ 3 is stored as "ORD123" to differentiate from "OR123" that corresponds to Anchor ID "1234." Correspondingly, the information stored under anchor "1234" is updated with a reference to the new anchor "5678."

At SEQ 5, an eBill ("EB987") is received naming "IN222," seller "4444" and buyer "6666" and is matched with "OR123" using the Secondary Match ID "IN222." This information received with eBill "EB987" is stored at SEQ 6 under Anchor ID "5678" as created with the receipt of invoice "IN222" at SEQ 3, with a reference to anchor "1234."

At SEQ 7, a status document "IN222A" is received from seller "4444" naming invoice "IN222" as a Secondary Match ID. Using "IN222," the status document "IN222A" is assigned to anchor "5678" and stored as such at SEQ 8, again referencing anchor "1234."

SEQ 9 is a non-document receipt type of sequence wherein the buyer "6666" changes the seller ID for anchor "1234" from seller "3333" to seller "4444." This change effectively changes all information stored under anchor "5678" to anchor "1234" and correspondingly removes any reference anchor information (with anchor "5678" not being used further).

FIG. 5C shows an embodiment involving the receipt first of invoice document data "IN456" that is devoid of buyer identification at SEQ 1, with business rules implemented consistently with FIG. 5A. The information received with invoice "IN456" is stored under Anchor ID "1234" at SEQ 2, with seller having Party ID "3333" being associated with both invoice "IN456" and order "OR123."

SEQ 3, an invoice ("IN6543") is received, referencing invoice "IN456" as a Secondary Match ID, naming the seller "3333" from invoice "IN456" as a buyer and further naming a new seller "8888." A new anchor having Anchor ID "9876" is built, referencing anchor "1234" due to the matching Secondary Match ID "IN456," with the information received with "IN6543" stored at SEQ 4.

At SEQ 5, eBill "EB987" is received, having Secondary Match ID "IN456" and naming seller "3333" and buyer "6666." This eBill "EB987" is matched to anchor "1234" using matching Secondary Match ID "IN456" and seller Party ID "3333." This information received with eBill "EB987" is stored at SEQ 6, referencing anchor "9876." In addition, other information stored under anchor "1234" is updated with the Named Buyer ID for this information set to buyer "6666."

At SEQ 7, an order "OR123" is received from buyer "666" and naming seller "3333." Order "OR123" is associated with anchor "1234" using "OR123" as the Primary Match ID. Information received with order "OR123" is stored at SEQ 8; however, the information received with order "OR123" is not stored with reference to anchor "9876" because the information received with the order did not correspond to invoice "IN6543" used to create anchor "9876."

At SEQ 9, status document "IN6543a" is received from buyer "6666," naming Seller "3333" with invoice "IN6543" (corresponding to the invoice received at SEQ 3) as the Secondary Match ID. Here, invoice "IN6543" as associated with seller "3333" corresponds to invoice "IN6543" but contradicts "IN6543" in that the buyer "3333" with "IN6543" is now listed as a seller. In this regard, a new anchor is formed having Anchor ID "5588" and the information received with status document "IN6543a" is stored at SEQ 10 under this new anchor and is further associated with anchor "9876" due to correspondence between buyer/seller Party ID "3333" and invoice "IN6543."

At SEQ 11, a status document "IN456a" is received from seller "3333," naming invoice "IN456" as the Secondary Match ID. Status document "IN456a" is stored under existing anchor "1234" at SEQ 12, using the seller Party Id "3333" and invoice "IN456" as matching criteria, and further is associated with anchor "9876." As in SEQ 6, the information stored from status document "IN456a" is also associated with buyer "6666."

An eBill "EB891" is received from a new buyer having Party ID "9999" at SEQ 13, naming seller "3333" and referencing eBill "EB987." A new anchor having Anchor ID "2222" is created for the information received with eBill "EB891" and stored at SEQ 14 with reference to anchor "1234" due to matching seller Party ID "3333." In addition, information stored under anchor "1234" for eBill "EB987" is updated with a reference to the new anchor "2222" due to matching eBill DocID "EB987." With this approach, transaction information stored under anchor "1234" is readily associated with other transactions having common transaction parties (under anchor "9876" and anchor "2222").

While certain aspects of the present invention have been described with reference to several particular example embodiments, those skilled in the art will recognize that many changes may be made thereto without departing from the spirit and scope of the present invention, aspects of which are set forth in the following claims.

What is claimed is:

1. A transaction-processing system comprising:
    a transaction databank having a plurality of anchor locations, each anchor location for storing a plurality of transaction-profile attributes that correspond to one of a plurality of transactions involving merchant offerings among parties including buyers and sellers; and
    a computer arrangement adapted to:
        determine each transaction by identifying a plurality of common attributes that define the transaction, the identified common attributes being carried by respective transaction-based documents as respectively provided by different parties to the transaction, the different parties to the transaction having different party-identifying attributes;
        assign an anchor identification (ID) to each transaction for which common attributes carried by respective transaction-based documents have been identified;
        for each transaction, use the identified common attributes to construct a plurality of transaction-profile attributes in a particular one of the anchor locations identified by the anchor ID;
        parse incoming transaction-based documents for the attributes of anchor locations stored in the transaction databank and, in response to finding insufficient matching attributes carried by one of the incoming transaction-based documents and stored in the transaction databank under an existing anchor location, establish a new anchor location in the transaction databank and store the attributes from the one of the incoming transaction-based documents in the new anchor location; and
        in response to another transaction-based document carrying transaction-profile attributes for a particular one of the anchor locations, use the constructed transaction-profile attributes in the particular anchor location to advance progress toward completion of the transaction for the particular anchor location by generating and outputting electronic payment data for the transaction.

2. The system of claim 1, wherein the computer arrangement is adapted to identify attributes for a transaction by matching attributes that are common to two or more respective transaction-based documents, and wherein the anchor ID is not one of the common attributes.

3. The system of claim 2, wherein the computer arrangement is adapted to match the attributes from specific transaction-profile attribute fields in each of the two or more transaction-based documents.

4. The system of claim 3, wherein the computer arrangement is adapted to access user-defined information identifying the specific transaction-profile attribute fields to use in matching the attributes.

5. The system of claim 1, wherein the computer arrangement is adapted to identify the attributes for a transaction as a function of predefined fields associated with an anchor location.

6. The system of claim 5, wherein the computer arrangement is adapted to parse incoming transaction-based documents for the identified attributes in the predefined fields and, in response to an incoming transaction-based document including the identified attributes, group the transaction-based document under the anchor location.

7. The system of claim 1, wherein the computer arrangement is adapted to define attribute fields used for establishing attributes that identify a particular transaction as a function of data in the defined attribute fields of the respective transaction-based documents, and wherein the anchor ID is not one of the common attributes.

8. The system of claim 7, wherein the computer arrangement is adapted to parse incoming transaction-based documents for data in the defined attribute fields and, in response to a transaction-based document including data in the defined attribute fields that matches the transaction-profile attributes of a particular one of the anchor locations, to assign the transaction-based document an anchor ID associated with the particular anchor location.

9. The system of claim 7, wherein the computer arrangement is adapted to define a first group of anchor attribute fields used for establishing attributes that identify a particular transaction as a function of the attribute fields in first and second transaction-based documents, and to define a second group of anchor attribute fields that identify the particular transaction as a function of the attribute fields in one of the first and second transaction-based documents and in a third transaction-based document, the first and second groups of attribute fields being different and both defining transaction-based documents belonging to the same transaction.

10. The system of claim 1, wherein the computer arrangement is adapted to parse incoming transaction-based documents for the identified attributes of anchor locations in the transaction databank and, in response to finding matching attributes carried by the transaction-based document and stored in the transaction databank under a particular anchor location, store the attributes from the transaction-based document in the particular anchor location.

11. The system of claim 1, wherein the computer arrangement is adapted to retrieve information from all transaction-based documents stored in the transaction databank and labeled with a particular anchor ID in response to a user request including the anchor ID.

12. The system of claim 1, wherein the computer arrangement is adapted to retrieve transaction-profile attributes stored in a particular anchor location in response to a user request including transaction-profile attributes from one of the transaction-based documents stored in the particular anchor location.

13. The system of claim 1, wherein the computer arrangement is adapted to assign restriction criteria to transaction-profile attributes for a particular transaction and, in response to detecting attributes of a new transaction-based document that match the transaction-profile attributes, including the restriction criteria, for the particular transaction, use the attributes of the new transaction-based document to construct a plurality of transaction-profile attributes in another one of the anchor locations.

14. The system of claim 13, wherein the computer arrangement is adapted to assign restriction criteria that limits an anchor location to storing only one of a particular type of transaction-based document, and to construct a plurality of transaction-profile attributes for the new transaction-based document in another one of the anchor locations in response to the new transaction-based document having attributes matching the type of another transaction-based document stored in the limited anchor location.

15. The system of claim 1, wherein the computer arrangement is adapted to advance progress toward completion of a transaction by generating transaction completion data for an active, previously incomplete transaction in response to the other transaction-based document including an update for the transaction-profile attributes in the particular one of the anchor locations.

16. The system of claim 15, wherein the computer arrangement is adapted to send the transaction completion data to users identified by the transaction-profile attributes in the particular anchor location.

17. The system of claim 15, wherein the computer arrangement is adapted to authorize payment for a particular transaction having transaction-profile attributes stored in a particular anchor location in response to receiving a transaction-based document having attributes that identify the document as belonging to the anchor location and indicating a transaction condition that is sufficient to authorize payment.

18. The system of claim 1, wherein the computer arrangement is further adapted to delineate the different party-identifying data in the transaction databank.

19. The system of claim 18, wherein the computer arrangement is further adapted to construct transaction-profile attributes in anchor locations according to the different party-identifying data.

20. The system of claim 1, wherein each anchor location having constructed transaction-profile attributes corresponds to only one unique transaction.

21. The system of claim 1, wherein the computer arrangement is adapted to merge transaction-profile attributes from two anchor locations to construct transaction-profile attributes in a new anchor location that corresponds to only one unique transaction having certain characteristics common to transactions to which said two anchor locations apply.

22. The system of claim 1, wherein the computer arrangement is further adapted to automatically monitor transaction data stored in the anchor locations for order fulfillment data and to automatically update order fulfillment status for transaction-based documents stored in the anchor locations in response to transaction data indicating characteristics of order fulfillment for the transaction.

23. The system of claim 1, wherein the computer arrangement is further adapted to store expense-related transaction-profile attributes in one of the anchor locations and to automatically classify expenses represented by the expense-related transaction-profile attributes into expense categories.

24. The system of claim 1, wherein the computer arrangement is further adapted to automatically generate and deliver interface documents to users identified by the transaction-profile attributes for a particular transaction, the interface documents including information for the particular transaction.

25. The system of claim 1, wherein the computer arrangement is further adapted to automatically generate transaction-profile attributes on a repetitive basis for a cyclic transaction having at least one particular anchor location, the automatically-generated transaction-profile attributes being used to reconstruct transaction-profile attributes in the at least one particular anchor location for the cyclic transaction.

26. A transaction-processing system for facilitating transactions involving merchant offerings among parties including buyers and sellers, aspects of each transaction being characterized by transaction-based documents, the system comprising:
 a transaction databank having a plurality of anchor locations, each anchor location for storing a plurality of transaction-profile attributes that correspond to one of the transactions; and
 a computer arrangement adapted to:
  parse attribute fields from at least two incoming documents and, in response to finding matching information in selected ones of the parsed attribute fields, automatically identify the at least two incoming documents as belonging to a transaction for which payment has not been made, generate a new anchor identification number as a function of the data in the parsed attribute fields, store data from the parsed attribute fields in an anchor location in the transaction databank and identify the anchor location with the new anchor identification number; and
  in response to another transaction-based document carrying data in attribute fields matching data in selected ones of the attribute fields stored in the anchor location identified with the new anchor identification number, use the data stored in the attribute fields and in the other transaction-based document to process payment for the transaction.

27. The system of claim 26, wherein the transaction databank is further configured and arranged to store user profile information for each party to the transaction, the user profile information including processing instructions for processing incoming documents corresponding to a particular transaction in which the party is involved, the computer arrangement being further adapted to process information from incoming documents corresponding to the particular transaction in accordance with the processing instructions.

28. In an environment of multiple parties to a transaction, a transaction terminal for processing transaction information related to an active transaction pursuant to a contract between one of the parties and another one of the parties, the transaction terminal comprising:
 at least one computer-based circuit being software-programmed and configured and arranged to
 compare attribute values of transaction-based documents and identify common attribute values between at least two of the transaction-based documents;
 define an anchor identification (ID) as a function of the identified common attribute values, the anchor ID being used to identify a new transaction also pursuant to the contract;

label the at least two transaction-based documents with the anchor ID and store the labeled transaction-based documents in a database; and in response to receiving another transaction-based document having attribute values that match attribute values in at least one of the at least two of the transaction-based documents, and prior to payment for the active transaction being made, use the stored transaction-based documents and the other transaction-based document to advance progress toward completion of the active transaction.

29. In an environment of multiple parties to a transaction, a transaction terminal for processing transaction information related to a transaction pursuant to a contract between one of the parties and another one of the parties, the terminal comprising:

at least one computer-based circuit being software-programmed and configured and arranged to compare elements of transaction-based documents and identify common elements between at least two of the transaction-based documents;

compare the common elements with stored profile information associated with the one and the other one of the parties; and define an anchor identification (ID) with the identified common elements and the profile information, the anchor ID being used to identify a new active transaction also pursuant to the contract for which performance of the transaction has not been completed by both parties to the transaction.

30. A method for facilitating transactions involving merchant offerings among parties including buyers and sellers, aspects of each common transaction being characterized by transaction-based documents that are respectively provided by different parties to the common transaction, the method comprising:

for each common transaction, identifying attributes that define the common transaction, the identified attributes being carried by respective transaction-based documents as respectively provided from the different parties to the common transaction, the different parties to the common transaction having different party-identifying attributes;

assigning an anchor identification (ID) to each common transaction for which attributes carried by respective transaction-based documents have been identified;

for each common transaction, using the identified attributes to construct a plurality of transaction-profile attributes in a particular anchor location of a transaction databank having a plurality of anchor locations and identifying the particular anchor location with the anchor ID;

parsing incoming transaction-based documents for the identified attributes of anchor locations stored in the transaction databank and, in response to finding insufficient matching attributes carried by one of the incoming transaction-based documents and stored in the transaction databank under an existing anchor location, establishing a new anchor location in the transaction databank and storing the attributes from the transaction-based document in the new anchor location; and in response to another transaction-based document carrying transaction-profile attributes for a particular one of the anchor locations, using the constructed transaction-profile attributes in the particular anchor location to advance progress toward completion of the common transaction for the particular anchor location by generating and outputting electronic payment data for initiating payment to a seller on behalf of a buyer for the transaction.

31. The method of claim 30, wherein identifying attributes that define the common transaction includes matching attributes that are common to two or more respective transaction-based documents.

32. The method of claim 31, wherein matching attributes that are common to two or more respective transaction-based documents includes matching attributes from specific transaction-profile attribute fields in each of the two or more transaction-based documents.

33. The method of claim 32, wherein matching attributes from specific transaction-profile attribute fields includes accessing user-defined information identifying the specific transaction-profile attribute fields.

34. The method of claim 30, wherein identifying attributes that define the common transaction includes defining attribute fields used for establishing attributes that identify a particular transaction as a function of data in the defined attribute fields of the respective transaction-based documents.

35. The method of claim 30, wherein using the identified attributes to construct a plurality of transaction-profile attributes in a particular anchor location includes parsing incoming transaction-based documents for the identified attributes of anchor locations in the transaction databank and, in response to finding matching attributes carried by the transaction-based document and stored in the transaction databank under a particular anchor location, storing the attributes from the transaction-based document in the particular anchor location.

36. The method of claim 30, further comprising assigning restriction criteria to transaction-profile attributes for a particular common transaction and, in response to detecting attributes of a new transaction-based document that match the transaction-profile attributes, including the restriction criteria, for the particular common transaction, using the attributes of the new transaction-based document to construct a plurality of transaction-profile attributes in another one of the anchor locations.

37. The method of claim 30, wherein using the constructed transaction-profile attributes in the particular anchor location to advance progress toward completion of the common transaction for the particular anchor location includes generating transaction completion data in response to the other transaction-based document including an update for the transaction-profile attributes in the particular one of the anchor locations.

38. The method of claim 37, further comprising authorizing payment for a particular transaction having transaction-profile attributes stored in a particular anchor location in response to receiving a transaction-based document having attributes that identify the document as belonging to the anchor location and indicating a transaction condition that is sufficient to authorize payment.

39. A method for facilitating transactions involving merchant offerings among parties including buyers and sellers, aspects of each common transaction being characterized by transaction-based documents that are respectively provided by different parties to the common transaction, the method comprising:

for each common transaction, identifying primary and secondary attributes that define the common transaction and assigning higher weight to the primary attribute, relative to the secondary attribute, the identified attributes being carried by respective transaction-based documents as respectively provided from the different parties to the common transaction, the different parties to the common transaction having different party-identifying attributes;

assigning an anchor identification (ID) to each common transaction for which attributes carried by respective transaction-based documents have been identified;

for each common transaction, using the identified attributes to construct a plurality of transaction-profile attributes in a particular anchor location of a transaction databank having a plurality of anchor locations and identifying the particular anchor location with the anchor ID; and in response to another transaction-based document carrying transaction-profile attributes for a particular one of the anchor locations, using the constructed transaction-profile attributes in the particular anchor location to advance progress toward completion of the common transaction for the particular anchor location by matching the other transaction based document with the attributes in the particular anchor location as a function of the primary and secondary attributes and their corresponding weight and by generating and outputting electronic payment data for initiating payment to a seller on behalf of a buyer for the transaction.

40. The method of claim 39, further comprising:

receiving a conflicting transaction-based document carrying transaction-profile attributes for a particular one of the anchor locations;

comparing the primary and secondary attributes of the conflicting transaction-based document and the other transaction-based document; and determining which of the conflicting and other transaction-based documents better match the transaction-profile attributes in the particular anchor location as a function of the primary and secondary attributes in each of the transaction-based documents.

41. The method of claim 40, further comprising:

assigning another anchor location to another common transaction for which attributes carried by the one of the conflicting and other transaction-based documents that does not better match the transaction-profile attributes in the particular anchor location as a function of the primary and secondary attributes in each of the transaction-based documents.

42. A transaction-processing system for facilitating transactions involving merchant offerings among parties including buyers and sellers, aspects of each common transaction being characterized by transaction-based documents that are respectively provided by different parties to the common transaction, the system comprising:

means for storing a plurality of transaction-profile attributes that correspond to a transaction;

means, for each common transaction for which at least one party to the transaction has not performed, for identifying attributes that define the common transaction, the identified attributes being carried by respective transaction-based documents as respectively provided from the different parties to the common transaction, the different parties to the common transaction having different party-identifying attributes;

means for assigning an anchor identification (ID) to each common transaction for which attributes carried by respective transaction-based documents have been identified;

means, for each common transaction, for using the identified attributes to construct a plurality of transaction-profile attributes in a particular one of the anchor locations identified by the anchor ID;

means for parsing incoming transaction-based documents for the identified attributes of anchor locations stored in the transaction databank and, in response to finding insufficient matching attributes carried by one of the incoming transaction-based documents and stored in the transaction databank under an existing anchor location, establishing a new anchor location in the transaction databank and storing the attributes from the transaction-based document in the new anchor location; and means, responsive to another transaction-based document carrying transaction-profile attributes for a particular one of the anchor locations, for using the constructed transaction-profile attributes in the particular anchor location to advance progress toward completion of the common transaction for the particular anchor location.

43. The system of claim 42, wherein the storing means includes a transaction databank, and wherein the anchor ID is not one of the common attributes.

44. The system of claim 42, wherein the assigning means includes a CPU-based circuit programmed to retrieve and associate an ID code that is unique to the each common transaction, wherein the storing means includes a memory databank, and wherein the means for using the constructed transaction-profile attributes includes a CPU-based circuit programmed to audit the common transaction as a function of the plurality of transaction-profile attributes, and wherein the anchor ID is not one of the common attributes.

45. The system of claim 1, wherein the anchor ID is not one of the common attributes.

* * * * *